United States Patent
Ozturk et al.

(10) Patent No.: US 11,463,985 B2
(45) Date of Patent: Oct. 4, 2022

(54) PAGING WITH MULTIPLE MONITORING OCCASIONS

(71) Applicant: QUALCOMM Incorporated, San Diego, CA (US)

(72) Inventors: Ozcan Ozturk, San Diego, CA (US); Xiaoxia Zhang, San Diego, CA (US); Andrei Dragos Radulescu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 16/857,051

(22) Filed: Apr. 23, 2020

(65) Prior Publication Data

US 2020/0344718 A1    Oct. 29, 2020

Related U.S. Application Data

(60) Provisional application No. 62/839,576, filed on Apr. 26, 2019.

(51) Int. Cl.
*H04W 68/00* (2009.01)
*H04W 24/08* (2009.01)
(Continued)

(52) U.S. Cl.
CPC .......... *H04W 68/005* (2013.01); *H04W 8/20* (2013.01); *H04W 16/14* (2013.01); *H04W 24/08* (2013.01);
(Continued)

(58) Field of Classification Search
CPC . H04W 68/005; H04W 24/08; H04W 72/042; H04W 76/11; H04W 74/0808;
(Continued)

(56) References Cited

U.S. PATENT DOCUMENTS

2015/0296385 A1* 10/2015 Zhang .................. H04L 5/0094
370/329
2016/0233989 A1* 8/2016 Belghoul ............... H04L 5/001
(Continued)

FOREIGN PATENT DOCUMENTS

WO    WO-2012125093 A1    9/2012
WO    WO-2014181981 A1    11/2014

OTHER PUBLICATIONS

Ericsson, eDRX solution, measurements and performance, May 25-29, 2015, 3GPP TSG WG2#90, Fukuoka, Japan (Year: 2015).*

(Continued)

*Primary Examiner* — Said M Elnoubi
(74) *Attorney, Agent, or Firm* — Holland & Hart LLP

(57) ABSTRACT

Methods, systems, and devices for wireless communications are described. Generally, the described techniques provide for determining a time to stop monitoring a wireless channel for paging information. In some examples, a user equipment (UE) may identify a plurality of paging occasions associated with a wireless channel (e.g., of an unlicensed radio frequency spectrum band) and monitor the wireless channel for paging information from a base station during a first paging occasion of the plurality of paging occasions. The UE may determine a channel occupancy status of the base station with respect to the wireless channel and may determine a time to stop monitoring the wireless channel for paging information. The UE may ignore a remainder of the plurality of paging occasions based on the determined time to stop monitoring the wireless channel.

47 Claims, 16 Drawing Sheets

(51) Int. Cl.
  *H04W 72/04* (2009.01)
  *H04W 76/11* (2018.01)
  *H04W 74/08* (2009.01)
  *H04W 16/14* (2009.01)
  *H04W 8/20* (2009.01)

(52) U.S. Cl.
  CPC ..... *H04W 72/042* (2013.01); *H04W 74/0808* (2013.01); *H04W 76/11* (2018.02)

(58) Field of Classification Search
  CPC ....... H04W 16/14; H04W 8/20; H04W 88/02; H04W 88/08; H04W 68/02
  See application file for complete search history.

(56) References Cited

U.S. PATENT DOCUMENTS

2020/0404617 A1* 12/2020 Murray ............. H04W 52/0229
2021/0168759 A1*  6/2021 Pan ................... H04W 72/042

OTHER PUBLICATIONS

ERICSSON: "eDRX Solution, Measurements and Performance", 3GPP TSG RAN WG2 #90, 3GPP Draft; R2-152429 EDRX Solution, Measurements and Performance, 3rd Generation Partnership Project (3GPP), Mobile Competence Centre; 650, Route Des Lucioles; F-06921 Sophia-Antipolis Cedex; France, vol. RAN WG2, No. Fukuoka, Japan; May 25, 2015-May 29, 2015, May 24, 2015 (May 24, 2015), 10 Pages, XP050973576, Retrieved from the Internet: URL: http://www.3gpp.org/ftp/Meetings_3GPP_SYNC/RAN2/Docs/ [retrieved on May 24, 2015] p. 1, lines 25-26, p. 1, lines 29-34.
International Search Report and Written Opinion—PCT/US2020/029905—ISA/EPO—dated Aug. 11, 2020.
Qualcomm Incorporated: "Initial Access and Mobility Procedures for NR Unlicensed", 3GPP TSG RAN WG1 Meeting #96bis, 3GPP Draft; R1-1905000 7.2.2.2.2 Initial Access and Mobility Procedures for NR-U, 3rd Generation Partnership Project (3GPP), Mobile Competence Centre; 650, Route Des Lucioles; F-06921 Sophia-Antipolis, vol. RAN WG1, No. Xi'an, China; Apr. 8, 2019-Apr. 12, 2019, Apr. 7, 2019 (Apr. 7, 2019), 15 Pages, XP051700115, Retrieved from the Internet: URL: http://www.3gpp.org/ftp/Meetings%5F3GPP%5FSYNC/RAN1/Docs/R1%2D1905000%2Ezip [retrieved on Apr. 7, 2019] par. 2.2.2, figure 7.

* cited by examiner

PAGING WITH MULTIPLE MONITORING OCCASIONS

CROSS REFERENCE

The present application for patent claims the benefit of U.S. Provisional Patent Application No. 62/839,576 by OZTURK et al., entitled "PAGING WITH MULTIPLE MONITORING OCCASIONS," filed Apr. 26, 2019, assigned to the assignee hereof, and expressly incorporated by reference herein.

FIELD OF TECHNOLOGY

The following relates generally to wireless communications, and more specifically to paging with multiple monitoring occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples of a wireless communications system (e.g., an NR system), a UE may monitor for paging information during one or more paging occasions (POs). In some examples, a UE may monitor extended POs or multiple POs for paging information.

SUMMARY

The described techniques relate to improved methods, systems, devices, and apparatuses that support paging with multiple monitoring occasions. Generally, the described techniques provide for determining a time to stop monitoring a wireless channel for paging information. In some examples, a user equipment (UE) may identify a plurality of paging occasions (POs) associated with a wireless channel (e.g., of an unlicensed radio frequency spectrum band) and monitor the wireless channel for paging information from a base station during a first PO of the plurality of POs. The UE may determine a channel occupancy status of the base station with respect to the wireless channel and may determine a time to stop monitoring the wireless channel for paging information. For example, the UE may detect a channel occupancy time (COT) after a base station gains access to an unlicensed wireless channel and may determine the time to stop monitoring the wireless channel based thereon. In some examples, the UE may detect a downlink control information (DCI) for the UE or for another UE and may determine that the base station has gained access to the unlicensed wireless channel and may determine a time to stop monitoring for paging information based on the DCI. In some examples of a licensed or unlicensed wireless channel, the UE may receive an explicit indication that paging is over and may determine a time to stop monitoring the wireless channel based on the explicit indication. The UE may ignore a remainder of the plurality of POs based on the determined time to stop monitoring the wireless channel.

A method of wireless communications at a UE is described. The method may include identifying a set of POs associated with a wireless channel of an unlicensed radio frequency spectrum band, monitoring the wireless channel for paging information from a base station during a first PO of the set of POs, determining a channel occupancy status of the base station with respect to the wireless channel of the unlicensed radio frequency spectrum band, determining, based on the monitoring and the channel occupancy status of the base station, a time to stop monitoring the wireless channel for paging information, and ignoring a remainder of the set of POs based on the determined time.

An apparatus for wireless communications at a UE is described. The apparatus may include a processor, memory in electronic communication with the processor, and instructions stored in the memory. The instructions may be executable by the processor to cause the apparatus to identify a set of POs associated with a wireless channel of an unlicensed radio frequency spectrum band, monitor the wireless channel for paging information from a base station during a first PO of the set of POs, determine a channel occupancy status of the base station with respect to the wireless channel of the unlicensed radio frequency spectrum band, determine, based on the monitoring and the channel occupancy status of the base station, a time to stop monitoring the wireless channel for paging information, and ignore a remainder of the set of POs based on the determined time.

Another apparatus for wireless communications at a UE is described. The apparatus may include means for identifying a set of POs associated with a wireless channel of an unlicensed radio frequency spectrum band, monitoring the wireless channel for paging information from a base station during a first PO of the set of POs, determining a channel occupancy status of the base station with respect to the wireless channel of the unlicensed radio frequency spectrum band, determining, based on the monitoring and the channel occupancy status of the base station, a time to stop monitoring the wireless channel for paging information, and ignoring a remainder of the set of POs based on the determined time.

A non-transitory computer-readable medium storing code for wireless communications at a UE is described. The code may include instructions executable by a processor to identify a set of POs associated with a wireless channel of an unlicensed radio frequency spectrum band, monitor the wireless channel for paging information from a base station during a first PO of the set of POs, determine a channel occupancy status of the base station with respect to the wireless channel of the unlicensed radio frequency spectrum band, determine, based on the monitoring and the channel occupancy status of the base station, a time to stop monitoring the wireless channel for paging information, and ignore a remainder of the set of POs based on the determined time.

In some examples of the method, apparatuses, and non-transitory computer-readable medium described herein, determining the channel occupancy status of the base station may include operations, features, means, or instructions for identifying a COT for the base station, where the first PO may be a next PO of the set of POs following the beginning of the COT.

In some examples of the method, apparatuses, and non-transitory computer-readable medium described herein, determining the channel occupancy status of the base station may include operations, features, means, or instructions for receiving a COT structure indication (COT-SI) from the base station, the COT-SI indicating the timing of the COT; where determining the time to stop monitoring the wireless channel for paging information includes determining to ignore the remainder of the set of POs subsequent to the first monitoring occasion based on the COT-SI.

Some examples of the method, apparatuses, and non-transitory computer-readable medium described herein may further include operations, features, means, or instructions for detecting an absence of paging information for the UE during the first monitoring occasion, where determining the time to stop monitoring the wireless channel for paging information may be based on the detected absence of paging information.

Some examples of the method, apparatuses, and non-transitory computer-readable medium described herein may further include operations, features, means, or instructions for receiving paging information from the base station for the UE during the first monitoring occasion where determining the time to stop monitoring the wireless channel for paging information may be based on receiving the paging information.

In some examples of the method, apparatuses, and non-transitory computer-readable medium described herein, determining the channel occupancy status of the base station further may include operations, features, means, or instructions for detecting a data transmission from the base station during the first PO, and where determining the time to stop monitoring the wireless channel for paging information may be based on the data transmission.

Some examples of the method, apparatuses, and non-transitory computer-readable medium described herein may further include operations, features, means, or instructions for detecting a cell radio network temporary identifier (C-RNTI) corresponding to the UE, where detecting the data transmission may be based on the C-RNTI.

In some examples of the method, apparatuses, and non-transitory computer-readable medium described herein, determining the channel occupancy status of the base station further may include operations, features, means, or instructions for receiving a DCI corresponding to a physical downlink shared channel (PDSCH).

In some examples of the method, apparatuses, and non-transitory computer-readable medium described herein, the first PO may include operations, features, means, or instructions for receiving, during a first paging monitoring occasion (PMO) of the set of PMOs of the first PO, a signal from the base station and where determining the time to stop monitoring the wireless channel for paging information further may include operations, features, means, or instructions for determining to stop monitoring subsequent PMOs of the set of PMOs based on receiving the signal from the base station.

A method of wireless communications at a UE is described. The method may include identifying a set of POs associated with a wireless channel of a radio frequency spectrum band, monitoring the wireless channel for paging information from a base station during a first PO of the set of POs, receiving, based on the monitoring, a paging termination message from the base station, and ignoring, based on the paging termination message, a remainder of the set of POs.

An apparatus for wireless communications at a UE is described. The apparatus may include a processor, memory in electronic communication with the processor, and instructions stored in the memory. The instructions may be executable by the processor to cause the apparatus to identify a set of POs associated with a wireless channel of a radio frequency spectrum band, monitor the wireless channel for paging information from a base station during a first PO of the set of POs, receive, based on the monitoring, a paging termination message from the base station, and ignore, based on the paging termination message, a remainder of the set of POs.

Another apparatus for wireless communications at a UE is described. The apparatus may include means for identifying a set of POs associated with a wireless channel of a radio frequency spectrum band, monitoring the wireless channel for paging information from a base station during a first PO of the set of POs, receiving, based on the monitoring, a paging termination message from the base station, and ignoring, based on the paging termination message, a remainder of the set of POs.

A non-transitory computer-readable medium storing code for wireless communications at a UE is described. The code may include instructions executable by a processor to identify a set of POs associated with a wireless channel of a radio frequency spectrum band, monitor the wireless channel for paging information from a base station during a first PO of the set of POs, receive, based on the monitoring, a paging termination message from the base station, and ignore, based on the paging termination message, a remainder of the set of POs.

In some examples of the method, apparatuses, and non-transitory computer-readable medium described herein, the paging termination message may be included in a DCI message. In some examples of the method, apparatuses, and non-transitory computer-readable medium described herein, the paging termination message may be included in a paging message. In some examples of the method, apparatuses, and non-transitory computer-readable medium described herein, the paging termination message may include an explicit indication, where ignoring the remainder of the plurality of POs is based on the explicit indication.

In some examples of the method, apparatuses, and non-transitory computer-readable medium described herein, the paging termination message may be addressed to the UE. In some examples of the method, apparatuses, and non-transitory computer-readable medium described herein, the paging termination message may be addressed to a group of UEs including the UE. Some examples of the method, apparatuses, and non-transitory computer-readable medium described herein may further include operations, features, means, or instructions for receiving a configuration message from the base station configuring the group of UEs to monitor the first PO.

In some examples of the method, apparatuses, and non-transitory computer-readable medium described herein, the group of UEs may be based on a system architecture evolution (SAE) temporary mobile subscriber identity (S-TMSI).

In some examples of the method, apparatuses, and non-transitory computer-readable medium described herein, the radio frequency spectrum band may be an unlicensed band radio frequency spectrum band, the method, apparatuses, and non-transitory computer-readable medium described herein further including operations, features, means, or instructions for receiving an initial signal from the base station associated with a beginning of a COT, and determining that the first PO is a next PO of the set of POs following the beginning of the COT.

In some examples of the method, apparatuses, and non-transitory computer-readable medium described herein, ignoring the remainder of the set of POs may further include operations, features, means, or instructions for ignoring the reminder of the set of POs immediately after receiving the paging termination message. In some examples of the method, apparatuses, and non-transitory computer-readable medium described herein, ignoring the remainder of the set of POs may further include operations, features, means, or instructions for identifying a threshold amount of time after receiving an explicit indication in the paging termination message and ignoring the remainder of the plurality of POs upon expiration of the threshold amount of time after receiving the explicit indication.

A method of wireless communications at a base station is described. The method may include identifying a set of POs associated with a wireless channel of a radio frequency spectrum band, sending, during a first PO of the set of POs, a paging termination message to a UE, and refraining, based on the paging termination message, from transmitting paging information during a remainder of the set of POs.

An apparatus for wireless communications at a base station is described. The apparatus may include a processor, memory in electronic communication with the processor, and instructions stored in the memory. The instructions may be executable by the processor to cause the apparatus to identify a set of POs associated with a wireless channel of a radio frequency spectrum band, send, during a first PO of the set of POs, a paging termination message to a UE, and refrain, based on the paging termination message, from transmitting paging information during a remainder of the set of POs.

Another apparatus for wireless communications at a base station is described. The apparatus may include means for identifying a set of POs associated with a wireless channel of a radio frequency spectrum band, sending, during a first PO of the set of POs, a paging termination message to a UE, and refraining, based on the paging termination message, from transmitting paging information during a remainder of the set of POs.

A non-transitory computer-readable medium storing code for wireless communications at a base station is described. The code may include instructions executable by a processor to identify a set of POs associated with a wireless channel of a radio frequency spectrum band, send, during a first PO of the set of POs, a paging termination message to a UE, and refrain, based on the paging termination message, from transmitting paging information during a remainder of the set of POs.

In some examples of the method, apparatuses, and non-transitory computer-readable medium described herein, the paging termination message may be included in a DCI message. In some examples of the method, apparatuses, and non-transitory computer-readable medium described herein, the paging termination message may be included in a paging message. In some examples of the method, apparatuses, and non-transitory computer-readable medium described herein, the paging termination message may include an explicit indication, where refraining from transmitting paging information during the remainder of the plurality of POs is based at least in part on the explicit indication.

In some examples of the method, apparatuses, and non-transitory computer-readable medium described herein, the paging termination message may be addressed to at least one of the UE or to a group of UEs.

In some examples of the method, apparatuses, and non-transitory computer-readable medium described herein, the group of UEs may be based on an S-TMSI.

DETAILED DESCRIPTION

Figure 1:
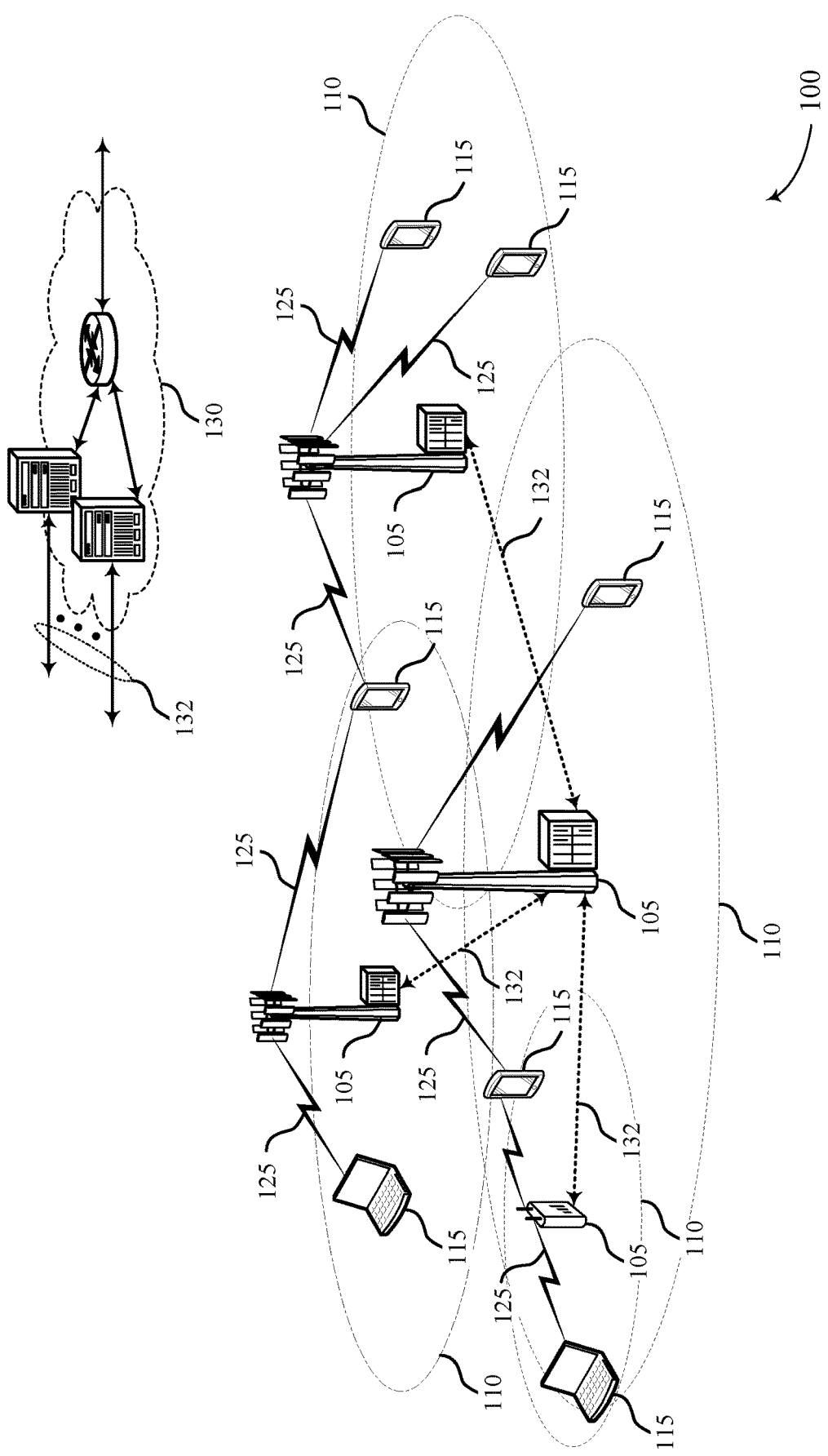
FIG. 1 illustrates an example of a system for wireless communications that supports paging with multiple monitoring occasions in accordance with aspects of the present disclosure.

In some examples of a wireless communications system (e.g., an NR system), a base station may communicate with one or more wireless devices (e.g., user equipments (UEs)). A base station may send paging information to one or more served UEs and the UEs may monitor for the paging information. In some examples, a UE may monitor for paging information during one or more paging occasions (POs), or during an extended PO, providing more opportunities to successfully receive paging information. For instance, when using an unlicensed radio frequency spectrum (e.g., in an NR-U system), a base station may contend for access to a wireless channel to send paging information to a UE, but one or more listen-before-talk (LBT) procedures may fail. In examples where the base station is unable to initially gain access to a wireless channel during a first PO, the base station may use a subsequent PO after an LBT procedure is successful to send paging information. However, in some examples, a base station may have no paging information to send to the UE, and the UE may inefficiently expend power to monitor multiple POs or extended POs. System efficiency may be further improved by configuring the base station to send pending paging information in earlier POs such that a UE may efficiently determine when to stop monitoring for paging information instead of continuing to monitor indefinitely across multiple POs or extended POs.

In some examples, a UE may determine that a base station has gained access to the wireless channel by detecting a channel occupancy time (COT) for the base station, and may determine when to stop monitoring for paging information based on the COT. In some cases, base station may send a signal indicating the initiation or total timing for the COT upon gaining access to an unlicensed channel. For instance, the base station may send a channel occupancy time initial signal (COT-IS) upon gaining access to the wireless channel. The COT-IS may indicate the start time of the COT. In such examples, the UE may identify a first PO subsequent to the start of the COT, may monitor for paging information during the first PO, and then ignore subsequent POs. That is, if the base station has paging information to send to the UE, it may send the paging information in a first available PO after the start of the COT. Thus, by monitoring the first PO, the UE may receive any pending paging information, or may determine that no paging information is forthcoming from the base station.

In some examples, the UE may determine that a base station has gained access to the wireless channel by detecting downlink signals and may determine when to stop monitoring for paging information based thereon. For instance, a UE in connected mode may detect a cell radio network temporary identifier (C-RNTI) during or after a first PO. The UE may determine, based on the C-RNTI that the base station has gained access to the wireless channel, and may stop monitoring subsequent POs based on the determination. In some examples, the UE may detect a valid downlink control information (DCI) corresponding to a physical downlink shared channel (PDSCH). The DCI may be for downlink communications with another UE. The UE may thus determine that the base station has gained access to the wireless channel, and that the base station would have sent paging information in a first PO if there was any pending paging information to send. Thus, the UE may determine to ignore subsequent POs.

In some examples, the UE may determine when to stop monitoring POs for paging information based on an explicit indication from the base station. The explicit indication (e.g., a paging termination message) may indicate the end of paging for a PO, an extended PO, a set of POs, or the like. The explicit indication may be included in a DCI, a paging message, or the like, and may be addressed to a group of UEs including the UE or addressed to the UE.

A UE may thus determine when to stop monitoring POs for paging information, resulting in improved power efficiency at the UE. The base station may refrain from sending paging information over the time-frequency resources of the ignored POs after the UE stops monitoring for paging information, and may use these time-frequency resources for other communications, resulting in increased system efficiency.

Aspects of the disclosure are initially described in the context of a wireless communications system. Aspects of the disclosure are further illustrated by and described with reference to timelines and process flows. Aspects of the disclosure are further illustrated by and described with reference to apparatus diagrams, system diagrams, and flowcharts that relate to paging with multiple monitoring occasions.

FIG. 1 illustrates an example of a wireless communications system 100 that supports paging with multiple monitoring occasions in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and a base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or have different capabilities. Some example UEs 115 are illustrated in FIG. 1. The UEs 115 described herein may be able to communicate with various types of devices, such as other UEs 115 as well as base stations 105 and network equipment (e.g., core network nodes, relay devices, integrated access and backhaul nodes), as shown in FIG. 1.

Base stations 105 may communicate with the core network 130, or with one another, or both. For example, base stations 105 may interface with the core network 130 through backhaul links 132 (e.g., via an S1, N2, N3, or other interface). Base stations 105 may communicate with one another over backhaul links 132 (e.g., via an X2, Xn, or other interface) either directly (e.g., directly between base stations 105), or indirectly (e.g., via core network 130), or both. In some examples, backhaul links 132 may be or include one or more wireless links.

Base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

UEs 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with each other via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals or system information, etc.), control signaling that coordinates operation for the carrier, user data, or other signaling. Wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)), and may be positioned according to a channel raster for discovery by UEs. A carrier may be operated in a standalone mode where initial acquisition and connection may be conducted by UEs via the carrier, or in a non-standalone mode where a connection is anchored using a different carrier (e.g., of the same or a different radio access technology).

Communication links 125 shown in wireless communications system 100 may include uplink transmissions from a UE 115 to a base station 105, or downlink transmissions from a base station 105 to a UE 115. Carriers may carry downlink or uplink communications (e.g., in an FDD mode), or be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit, which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). The radio frames may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain $N_f$ sampling periods. The duration of the symbol periods may depend on the subcarrier spacing or frequency band of operation.

A subframe, a slot, a mini-slot, or a symbol may be the smallest scheduling unit of the wireless communications system 100, and may be referred to as a transmission time interval (TTI). In some cases, the TTI duration (that is, the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., control resource sets (CORESETs)) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs and UE-specific search space sets for sending control information to a specific UE.

In some examples, a base station 105 may be movable and therefore provide communication coverage for a moving geographic coverage area 110. In some examples, different geographic coverage areas 110 associated with different technologies may overlap, but may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving deep sleep mode, such as a configured discontinuous reception (DRX) off mode, when not engaging in active communications, or operating over a limited bandwidth (e.g., according to narrowband communications). For example, some UEs 115 may be configured for operation using a narrowband protocol type (e.g., NB-IoT) that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, wireless communications system 100 may be configured to support ultra-reliable low-latency communications (URLLC) or mission critical communications. UEs 115 may be designed to support ultra-reliable, low-latency, or critical functions (e.g., mission critical functions. Ultra-reliable communications may include private communication or group communication, and may be supported by one or more mission critical services such as mission critical push-to-talk (MCPTT), mission critical video (MCVideo), or mission critical data (MCData). Support for mission critical functions may include prioritization of services and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., mobility management entity (MME), access and mobility management function (AMF)), and at least one user plane entity that routes packets or interconnects to external networks (e.g., serving gateway (S-GW), Packet Data Network (PDN) gateway (P-GW), user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services. The operators IP services may include access to the Internet, Intranet(s), an IP Multimedia Subsystem (IMS), or a Packet-Switched Streaming Service.

Some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). Each access network transmission entity may include one or more antenna panels. In some configurations, various functions of each access network entity or base station 105 may be distributed across various network devices (e.g., radio heads and ANCs) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. But the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

Base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115 Some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by a transmitting device such as a base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality.

In some cases, transmissions from a device (e.g., from a base station 105, from a UE 115) may be performed using multiple beam directions, and the base station may use a combination of digital precoding or radio frequency beamforming to generate a combined beam for transmission to the UE 115. The UE 115 may report feedback that indicates precoding weights for one or more beam directions, and the feedback may correspond to a configured number of beams across a system bandwidth or one or more sub-bands. The base station 105 may transmit reference signals (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at a plurality of antenna elements of an antenna array, or by processing received signals according to different receive beamforming weight sets applied to signals received at a plurality of antenna elements of an antenna array, any of which may be referred to as "listening" according to different receive configurations or receive directions. In some examples a receiving device may use a single receive configuration to receive along a single beam direction (e.g., when receiving a data signal). The single receive configuration may be aligned in a beam direction determined based at least in part on listening according to different receive configuration directions (e.g., a beam direction determined to have a highest signal strength, highest signal-to-noise ratio, or otherwise acceptable signal quality based at least in part on listening according to multiple beam directions).

Wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Generally, the described techniques provide for determining, by a UE 115, a time to stop monitoring a wireless channel for paging information. In some examples, the UE 115 may identify a plurality of POs associated with a wireless channel (e.g., of an unlicensed radio frequency spectrum band) and monitor the wireless channel for paging information from a base station during a first PO of the plurality of POs. The UE 115 may determine a channel occupancy status of a base station 105 with respect to the wireless channel and may determine a time to stop monitoring the wireless channel for paging information. For example, the UE 115 may detect a COT after a base station gains access to an unlicensed wireless channel and may determine the time to stop monitoring the wireless channel based thereon. In some examples, the UE 115 may detect a DCI for the UE 115 or for another UE 115 and, as such, may determine that the base station 105 has gained accessed to the unlicensed wireless channel and determine a time to stop monitoring for paging information based on the DCI. In some examples of a licensed or unlicensed wireless channel, the UE 115 may receive an explicit indication that paging is over and may determine a time to stop monitoring the wireless channel based on the explicit indication. The UE 115 may ignore a remainder of the plurality of POs based on the determined time to stop monitoring the wireless channel.

Figure 2:
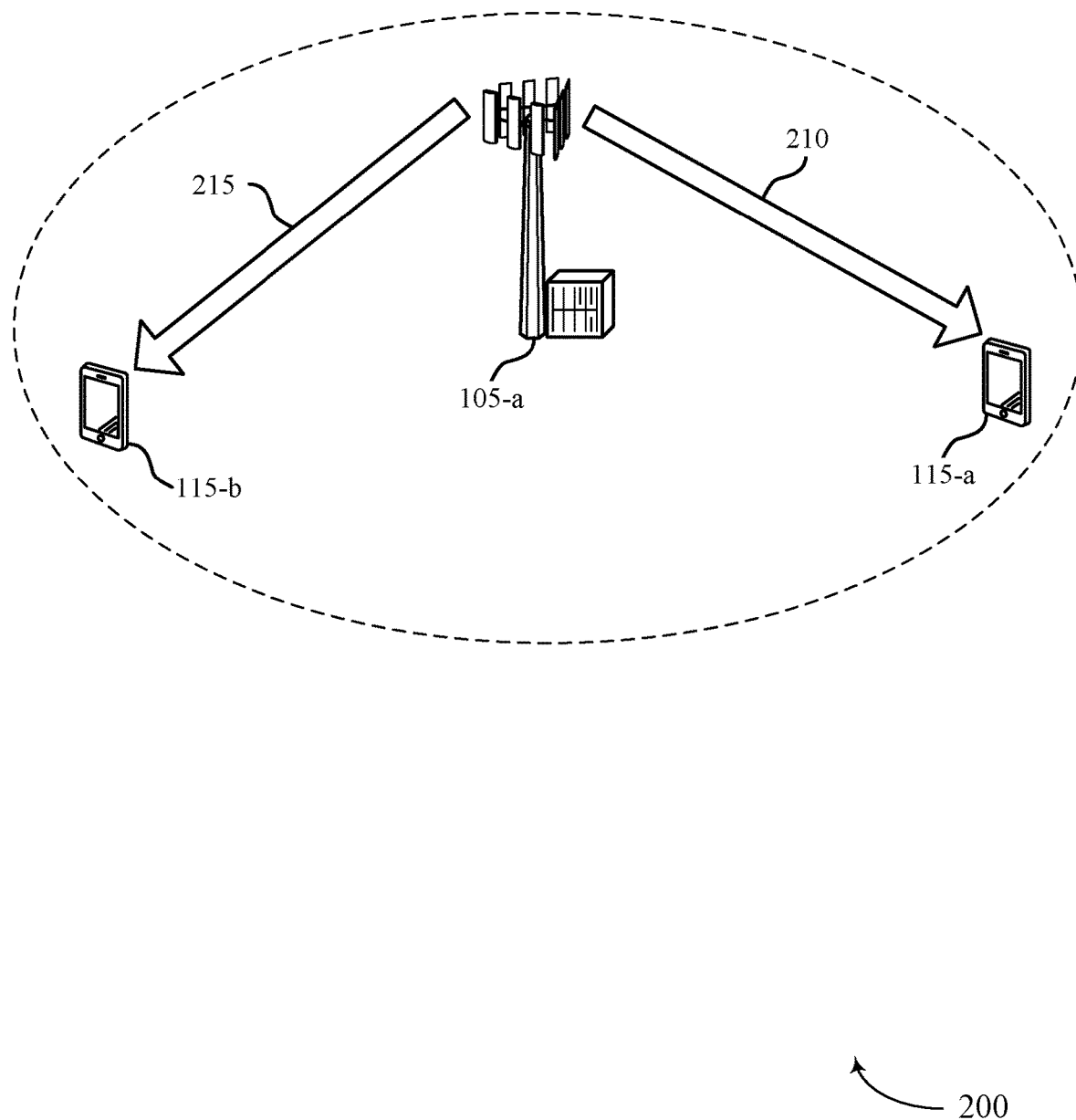
FIG. 2 illustrates an example of a wireless communications system that supports paging with multiple monitoring occasions in accordance with aspects of the present disclosure.

FIG. 2 illustrates an example of a wireless communications system 200 that supports paging with multiple monitoring occasions in accordance with aspects of the present disclosure. In some examples, wireless communications system 200 may implement aspects of wireless communications system 100. Wireless communications system 200 may include a base station 105-*a* and a UE 115-*a* and a UE 115-*b*, which may be examples of corresponding devices described with respect to FIG. 1.

Base station 105-*a* may serve one or more UEs 115 (e.g., UE 115-*a* and UE 115-*b*). Base station 105-*a* may communicate using licensed radio frequency spectrum or unlicensed radio frequency spectrum (e.g., NR-U). In some examples, base station 105-*a* may have paging information to send to a UE 115 (e.g., UE 115-*a*) via downlink 210, or paging information to send to UE 115-*b* via downlink 215.

In some examples, UEs 115 may monitor for paging information during one or more POs. A PO may include one or more paging monitoring occasions (PMOs). Each PMO of a PO may correspond to particular time (e.g., a TTI of a physical downlink control channel (PDCCH)) and a particular spatial beam. For instance, to receive a downlink message (e.g., paging information), a UE may perform a beam sweep. For a UE that performs a four-beam beam sweep, a PO may include four PMOs corresponding to the four beams of the beam sweep. For a particular PO, a UE may monitor four beams during four corresponding PMOs. For a UE that communicates via a single beam, each PO may only include a single PMO.

In some examples, a UE 115 may be configured to monitor multiple POs. Base station 105-*a* may configure the UE to monitor a set of noncontiguous POs across time. In some examples, base station 105-*a* may configure the UE to monitor an extended PO. An extended PO may include more PMOs than a standard PO, including multiple beam sweeps across a number of beams. For instance, a standard PO for a UE in a four-beam case may include four PMOs. An extended PO may include a number of PMOs equal to four times an integer n (e.g., 12 PMOs where n=3). For such an extended PO, the UE may monitor each of the 12 contiguous PMOs for paging information from the base station.

Multiple POs, or extended windows including multiple POs, may alleviate the impact of LBT procedures when communicating using an unlicensed radio frequency spectrum. For example, base station 105-*a*, operating in an NR-U system, may have paging information to send to UE 115-*a* via downlink 210. However, base station 105-*a* may perform one or more LBT procedures to obtain access to an unlicensed channel. If UE 115-*a* monitors for paging information during a first paging opportunity and does not receive the paging information because base station 105-*a* has not gained access to the wireless channel, the transmission of paging information may fail. However, if UE 115-*a* monitors for paging information during multiple POs, then it may receive the paging information during one of the multiple POs after base station 105-*a* gains access to the wireless channel.

In some examples, a UE 115-*a* may stop monitoring upon receiving a message over downlink 210. For example, if UE 115-*a* receives a message decodes a paging radio network temporary identifier) P-RNTI in a PO of the set of POs, then UE 115-*a* may stop monitoring additional POs even if it does not get a message. Base station 105-*a* may schedule paging information in an earliest available PO (e.g., after gaining access to a wireless channel), which may prevent a base station 105-*a* from using multiple POs as a paging capacity enhancement.

In some examples, UE 115-*a* may stop monitoring some POs of a set of POs even if it does not receive a message including a P-RNTI if UE 115-*a* detects that base station 105-*a* has already gained access to a wireless channel. For instance, UE 115-*a* may detect a start time for a COT, may detect other downlink signaling such as scheduling information, or may receive an explicit indication from base station 105-*a* indicating the termination of subsequent paging information.

UE 115-*a* may determine that base station 105-*a* has gained access to the wireless channel by detecting a COT for base station 105-*a*. The COT may define the amount of time base station 105-*a* has access to the wireless channel after a successful LBT procedure. UE 115-*a* may determine when to stop monitoring for paging information based on the COT. In some cases, base station 105-*a* may send an initial signal indicating the initiation or total timing for the COT upon gaining access to the unlicensed channel. For instance, base station 105-*a* may send a channel occupancy time structure indication (COT-SI) upon gaining access to the wireless channel. The COT-SI may indicate the start time of the COT. In such examples, UE 115-*a* may identify a first PO subsequent to the start of the COT, may monitor for paging information during the first PO, and then ignore subsequent POs. That is, if base station 105-*a* has paging information to send to UE 115-*a*, it may send the paging information in a first available PO after the start of the COT. Thus, by monitoring the first PO, UE 115-*a* may receive any pending paging information or may determine that no paging information is forthcoming from base station 105-*a*.

In some examples, UE 115-*a* may determine that base station 105-*a* has gained access to the wireless channel by detecting downlink 210 or downlink 215 and may determine when to stop monitoring for paging information based thereon. For instance, UE 115-*a* may operate using a connected mode and may detect DCI. For instance, UE 115-*a* may receive a DCI over downlink 210 including a C-RNTI during or after a first PO. UE 115-*a* may determine, based on the C-RNTI that base station 105-*a* has gained access to the wireless channel, and may stop monitoring subsequent POs based on the determination. In some examples, UE 115-*a* may detect a valid DCI corresponding to a PDSCH. The DCI may be for downlink communications with UE 115-*b* (e.g., transmitted over downlink 215). UE 115-*a* may thus determine that base station 105-*a* has gained access to the wireless channel and that base station 105-*a* would have sent paging information in a first PO to UE 115-*a* if there was any pending paging information to send to UE 115-*a*. Thus, UE 115-*a* may determine to ignore subsequent POs.

In some examples, UE 115-*a* may determine when to stop monitoring POs for paging information based on an explicit indication from the base station. The explicit indication (e.g., a paging termination message) may indicate the end of paging for a PO, an extended PO, a set of POs, or the like. The explicit indication may be included in a DCI, a paging message, or the like, and may be addressed to a group of UEs including the UE or addressed to the UE. Base station 105-*a* may communicate via unlicensed spectrum and may send the explicit indication upon determining that base station 105-*a* has no pending paging information to send to UE 115-*a*, upon expiration of a COT, or at the end of a first PO after gaining access to a wireless channel. Base station 105-*a* may communicate via licensed spectrum and may send the explicit indication upon determining that base station 105-*a* has no pending paging information to send.

UE 115-*a* may thus determine when to stop monitoring POs for paging information. Based on this determination, the UE may optimize when it enters a sleep mode, such as a DRX off mode, potentially resulting in improved power efficiency at UE 115-*a*. Base station 105-*a* may refrain from sending paging information over the time-frequency resources of the ignored POs after UE 115-*a* stops monitoring for paging information and may use these time-frequency resources for other communications (e.g., with UE 115-*b* or another UE), resulting in increased system efficiency.

Figure 3:
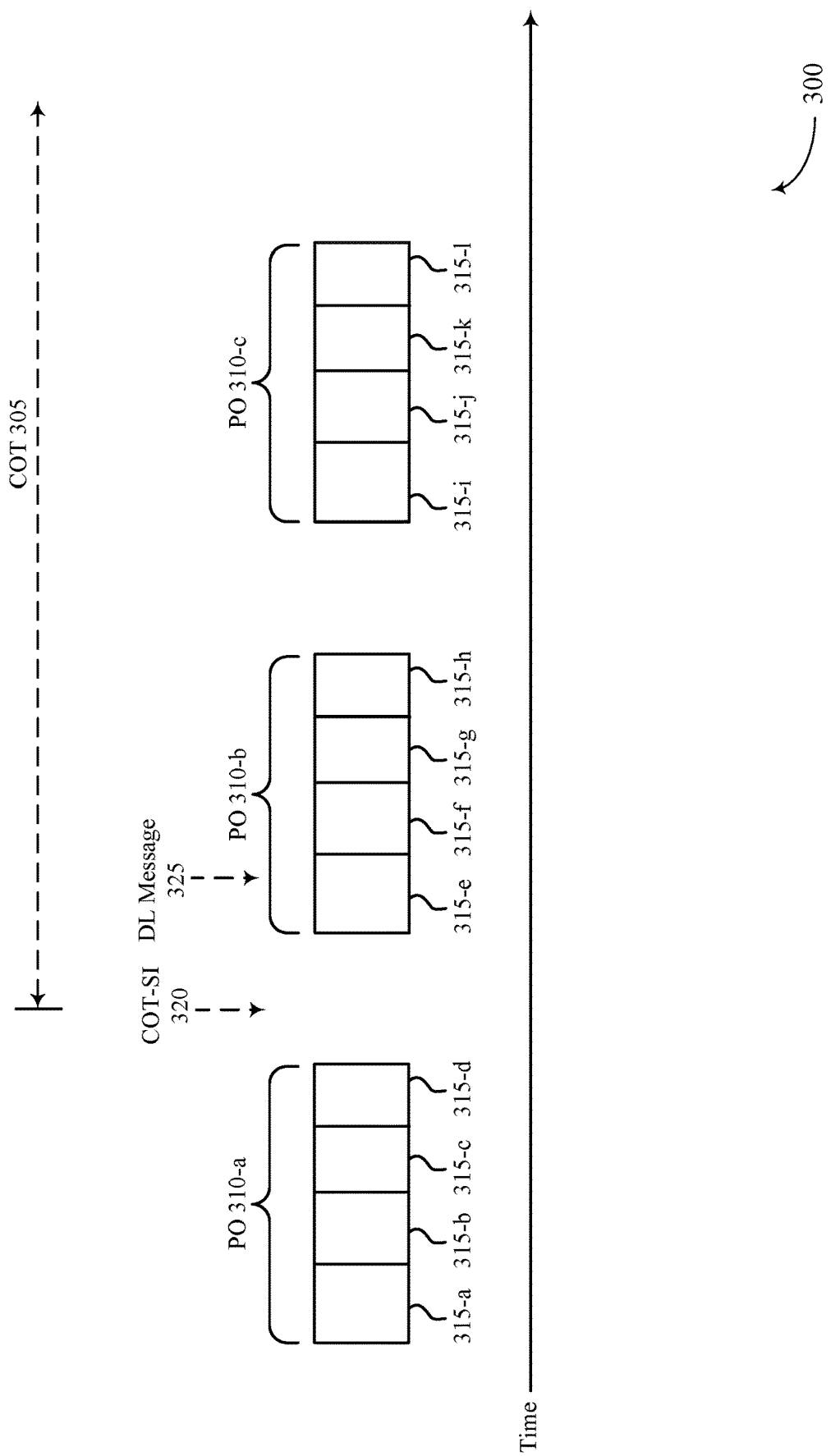
FIG. 3 illustrates an example of a timeline that supports paging with multiple monitoring occasions in accordance with aspects of the present disclosure.

FIG. 3 illustrates an example of a timeline 300 that supports paging with multiple monitoring occasions in accordance with aspects of the present disclosure. In some examples, timeline 300 may implement aspects of wireless communications system 100 or wireless communications system 200. For examples, the timeline 300 may illustrate communications between two devices, such as a UE 115 and a base station 105, which may be examples of corresponding devices as described herein.

A UE 115 may monitor multiple POs 310 for paging information. In some examples, each PO 310 may include multiple PMOs 315, each of which may correspond to a spatial beam. For instance, if a UE 115 communicates via a single spatial beam, then each PO 310 may include only one PMO. However, if UE 115 is capable of communicating via multiple beams (e.g., four beams), then each PO 310 may include multiple PMOs 315 (e.g., four PMOs 315). Thus, UE 115 may monitor for paging information during PMO 315-*a*, PMO 315-*b* PMO 315-*c*, and PMO 315-*d* of PO 310-*a*. Unless one of the conditions described below is met, then UE 115 may also monitor for paging information during PMO 315-*e*, PMO 315-*f*, PMO 315-*g*, and PMO 315-*h* of PO 310-*b* and during PMO 315-*i*, PMO 315-*j*, PMO 315-*k*, and PMO 315-1 of PO 310-*c*.

UE 115 may monitor for paging information beginning at a first PO 310, or first PMO 315. If UE 115 is operating in an idle or inactive mode, UE 115 may select a first PO 310-*a* based on a formula. If UE 115 is operating in a connected mode, UE 115 may select any PO 310 or PMO 315 to begin monitoring.

In some examples, base station 105 may contend for access to an unlicensed wireless channel. Base station 105 may have pending paging information for UE 115, and may perform one or more LBT procedures. However, one or more of the LBT procedures may fail. Thus, during PO 310-*a*, base station 105 may fail to gain access to the unlicensed wireless channel. UE 115 may monitor for paging information during PO 310-*a* and may not receive any paging information. After PO 310-*a*, base station 105 may perform a successful LBT procedure, and may gain access to the wireless channel. COT 305 may define the time during which base station 105 has access to the wireless channel.

In some examples, UE 115 may detect the beginning of COT 305. For instance, upon gaining access to the unlicensed wireless channel, base station 105 may transmit an initial signal indicating a start time for COT 305, a duration for COT 305, or both. In some examples, the initial signal may be a COT-SI 320. COT-SI 320 may indicate the start time of COT 305. UE 115 may identify the first PO 310 that begins after the beginning of COT 305 (e.g., based on receiving COT-SI 320). In such examples, UE 115 may monitor for paging information during PO 310-b. In some examples, UE 115 may receive a downlink message 325 during PO 310-b based on the monitoring. Downlink message 325 may be paging information. Upon receiving the paging information during PO 310-b, UE 115 may stop monitoring for paging information, and may ignore subsequent POs 310 (e.g., PO 310-c). In some examples, UE 115 may stop monitoring additional PMOs 315 upon receiving paging information. For instance, UE 115 may receive downlink message 325 during a first PMO 315-e of PO 310-b (e.g., on a first beam of a four-beam beam sweep procedure). Upon receiving the paging information during PMO 315-e, UE 115 may stop monitoring for paging information during PMO 315-f, PMO 315-g, and PMO 315-h, and may stop monitoring for paging information during subsequent PO 310-c (including all PMOs 315 included in PO 310-c). Alternatively, UE 115 may continue to monitor all PMOs 315 included in PO 310-b regardless of whether it receives paging information during a first PMO 315-e. In some examples, UE 115 may not receive any paging information during PO 310-b. In such examples, UE 115 may monitor for paging information for the duration of PO 310-b, and, upon determining that no paging information has been received during PO 310-b, may stop monitoring for paging information for subsequent PO 310-c (e.g., even though no P-RNTI was detected during PO 310-b).

In some examples, UE 115 may detect other downlink transmissions (e.g., besides COT-SI 320) and may determine that base station 105 has gained access to the unlicensed wireless channel based thereon. In other words, UE 115 may miss COT-SI 320 or base station 105 may not send a COT-SI 320 upon gain access to the unlicensed channel. In such examples, UE 115 may detect scheduling information transmitted by base station 105. In some examples, downlink message 325 may be a DCI. The DCI may include a C-RNTI and may correspond to a pending communication from base station 105. In some examples, UE 115 may operate in a connected mode and may monitor for its own C-RNTI. In such examples, UE 115 may determine, based on the C-RNTI, that base station 105 has gained access to the wireless channel. In such examples, UE 115 may stop monitoring for paging information during PO 310-c or may stop monitoring for paging information during PMO 315-f. In some examples, UE 115 may operate in an idle mode. Downlink message 325 may include a DCI addressed to another UE 115. In such examples, UE 115 may determine that base station 105 has gained access to the wireless channel and may stop monitoring for paging information during PO 310-c or PMO 315-f.

In some examples, base station 105 may send a downlink message 325 including an explicit indication (e.g., a paging termination message) to UE 115, indicating a PMO 315 or PO 310 that marks the end of paging for a PO 310 or set of POs 310. The indication may be included in a DCI or a paging message. In some examples, the DCI may include a P-RNTI. The indication may be addressed to the receiving UE 115 or to a group of UEs 115 including the receiving UE 115. If the indication is addressed to a group of UEs 115, then a group identifier may be included in the indication. In some examples, UE grouping may be based on a system architecture evolution (SAE) temporary mobile subscriber identity (S-TMSI). UE 115 may determine when to stop monitoring for paging information (e.g., during PMO 315-f or PO 310-c) based on the indication. In some examples, base station 105 may communicate via licensed spectrum and may send the indication to communicate to the UE 115 that no more paging information is forthcoming. In some other examples, base station 105 may communicate via unlicensed spectrum and may send the indication to communicate that no more paging information is forthcoming (e.g., because no paging information is pending, because the COT is over, or the like).

Figure 4:
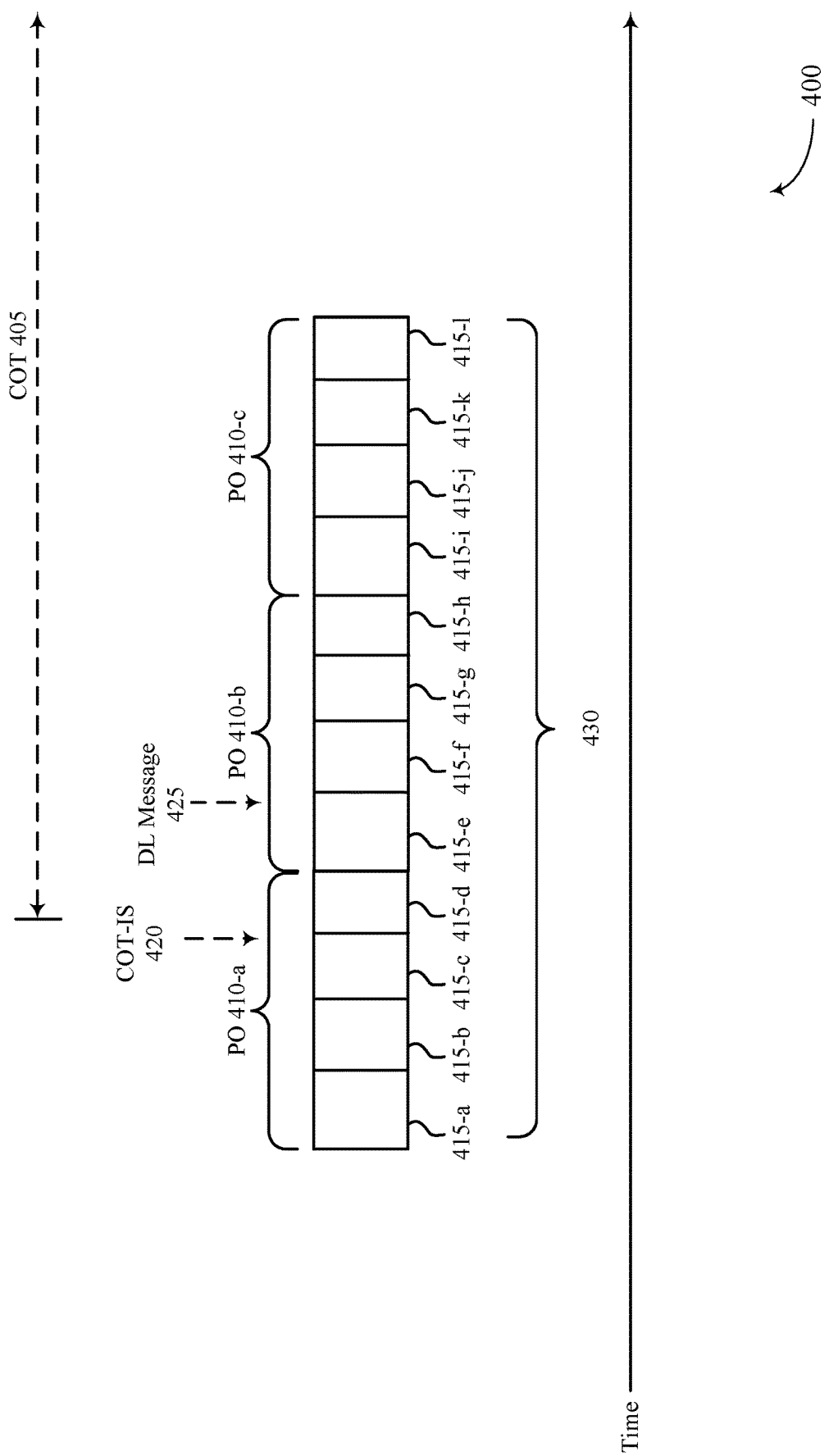
FIG. 4 illustrates an example of a timeline that supports paging with multiple monitoring occasions in accordance with aspects of the present disclosure.

FIG. 4 illustrates an example of a timeline 400 that supports paging with multiple monitoring occasions in accordance with aspects of the present disclosure. In some examples, timeline 400 may implement aspects of wireless communications system 100 or wireless communications system 200. For example, the timeline 400 may illustrate communications between two devices, such as a UE 115 and a base station 105, which may be examples of corresponding devices as described herein.

In some examples, a UE 115 may monitor for paging information during an extended PO window 430. Instead of a set of POs 310 as described with respect to FIG. 3, UE 115 may monitor a consecutive set of PMOs 415. For instance, an extended PO window 430 may include multiple (e.g., 3) standard POs 410-a, 410-b, and 410-c, and each of the standard POs 410 may include multiple PMOs 415 (e.g., PMO 415-a, PMO 415-b, PMO 415-c, PMO 415-d, PMO 415-e, PMO 415-f, PMO 415-g, PMO 415-h, PMO 415-i, PMO 415-j, PMO 415-k, and PMO 415-1).

The methods described with respect to FIG. 3 may be performed using the extended PO window 430 illustrated and described with respect to FIG. 4. For example, base station 105 may contend for access to an unlicensed wireless channel, and may gain access after or during PO 410-a. Upon initiation of COT 405, base station 105 may send an initial signal, such as COT-IS 420, indicating the start of COT 405. UE 115 may identify a next PMO 415-d or a next PO 410-b, monitor for paging information during the identified PMO 415-d or PO 410-b, and stop monitoring for paging information during subsequent PMOs 415 or POs 410 based on the COT-SI.

In some examples, UE 115 may identify scheduling information (e.g., in a downlink message 425) and may identify a time to stop monitoring for paging information based thereon. For instance, UE 115 may detect a DCI for itself or for another UE 115, and may identify a next PMO 415 or next PO 410 after the DCI. For instance, upon receiving a DCI during PMO 415-e, UE 115 may stop monitoring for paging information during subsequent PMOs 415 or POs 410 based thereon.

In some examples, UE 115 may determine a time to stop monitoring for paging information based on an explicit indication received in downlink message 425. The explicit indication may indicate that paging is terminated for subsequent PMOs 415 or POs 410.

Figure 5:
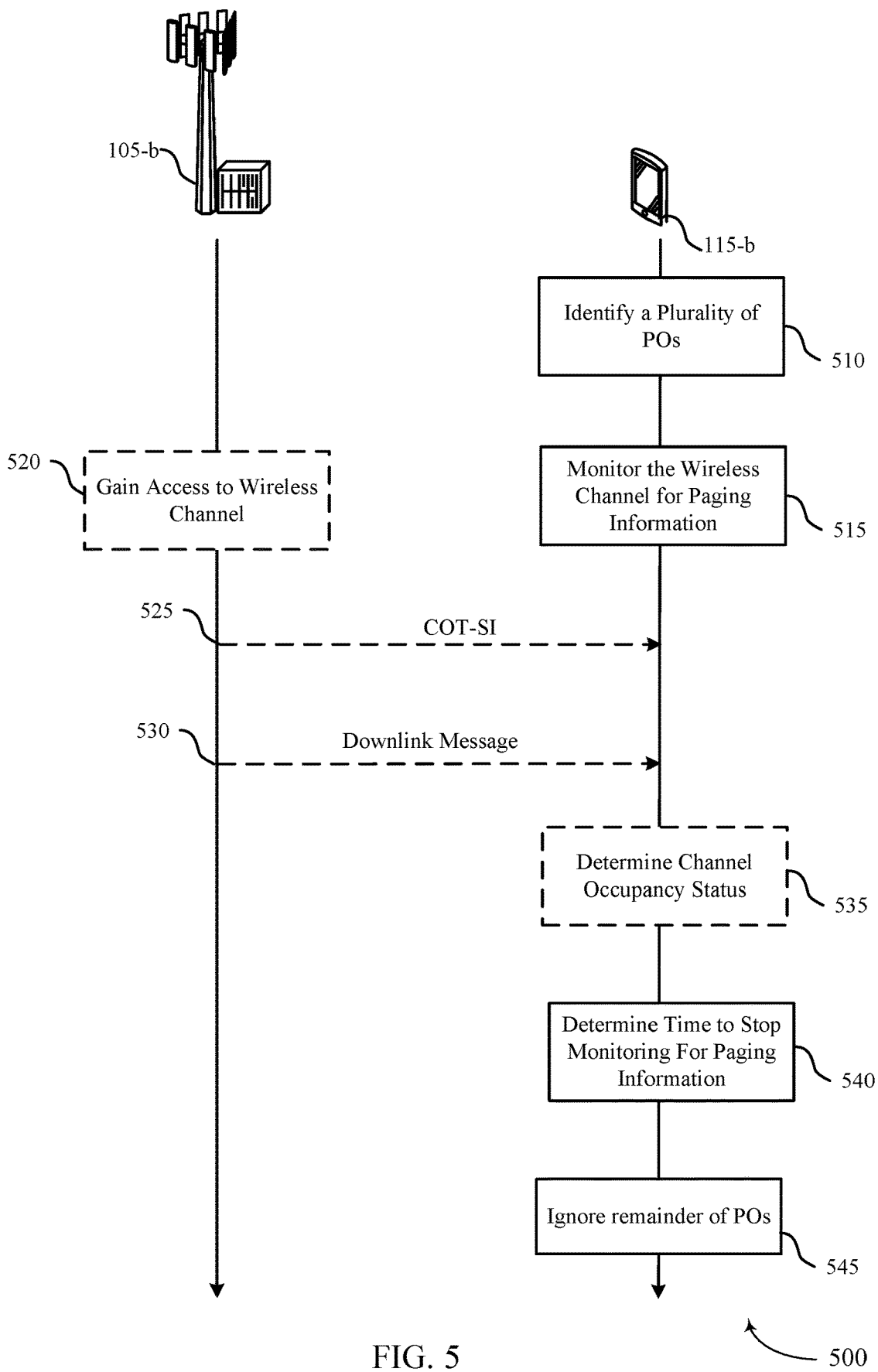
FIG. 5 illustrates an example of a process flow that supports paging with multiple monitoring occasions in accordance with aspects of the present disclosure.

FIG. 5 illustrates an example of a process flow 500 that supports paging with multiple monitoring occasions in accordance with aspects of the present disclosure. In some examples, process flow 500 may implement aspects of wireless communications system 100. In some examples, process flow 500 may include a UE 115-b and a base station 105-b, which may be examples of corresponding devices illustrated and described with respect to FIG. 1. and FIG. 2.

At 510, UE 115-b may identify a set of POs. The set of POs may be associated with a wireless channel of a licensed or unlicensed radio frequency spectrum band.

At 515, UE 115-b may monitor the wireless channel for paging information from base station 05-b during a first paging occasion of the set of paging occasions.

At 520, base station 105-b may gain access to the wireless channel. In some examples, base station 105-b may perform one or more LBT procedures and one of the LBT procedures may be successful.

At 525, if base station 105-b gains access to an unlicensed wireless channel, base station 105-b may transmit an initial signal (e.g., a COT-SI) to UE 115-b indicating the start time of the COT.

At 530, base station 105-b may transmit a downlink message. The downlink message may be paging information for UE 115-b, may be a DCI corresponding to a PDSCH for UE 115-b (e.g., including a C-RNTI) or another UE 115, or may be an explicit indication (e.g., a paging termination message) for UE 115-b indicating that no paging information is pending. The explicit indication may be addressed to the UE 115-b or may be addressed to a group of UEs 115. UE grouping may be based on an S-TMSI.

At 535, UE 115-b may determine a channel occupancy status. For instance, if base station 105-b sends the COT-SI at 525, then UE 115-b may determine the channel occupancy status based on the COT-SI. In some examples, if the downlink message is paging information, UE 115-b may determine that base station 105-b has gained access to the wireless channel based thereon. In some examples, if the downlink message is a DCI addressed to UE 115-b or addressed to another UE 115, UE 115-b may determine that base station 105-b has gained access to the wireless channel based thereon.

In some examples, the downlink message may be an explicit indication that no further paging information is forthcoming. For instance, base station 105-b may be communicating via a licensed wireless channel (and thus does not gain access to the wireless channel at 520 or send a COT-SI at 525). Or, base station 105-b may be commutating via an unlicensed wireless channel and UE 115-b may determine that base station 105-b has gained access to the wireless channel and that no paging information is pending based on the explicit indication.

At 540, UE 115-b may determine a time to stop monitoring for paging information. For example, if the downlink message is paging information received in the first PO, then UE 115-b may receive the paging information and may determine to stop monitoring for paging information in a next PO or a next PMO. In some examples, if UE 115-b does not receive any downlink message at 530, then UE 115-b may determine that no paging information is forthcoming, and may monitor a first PO or first PMO after the imitation of the COT (e.g., based on the COT-SI received at 525) and may then determine to stop monitoring for paging information at a PO or PMO subsequent to the first PO or first PMO, respectively, after the initiation of the COT. In some examples, if the downlink message is a DCI, then UE 115-b may stop monitoring for paging information in a next PO or next PMO after receiving the DCI. In some examples, if the downlink message is an explicit indication of an end of paging, then UE 115-b may stop monitoring for paging information immediately after receiving the explicit indication, or upon expiration of a threshold amount of time after receiving the explicit indication, or after a particular PO or PMO indicated in the explicit indication.

At 545, UE 115-b may ignore a remainder of the plurality of POs after the time at which UE 115-b determined to stop monitoring for paging information. Ignoring the remainder of the plurality of POs may result in power saving at the UE, which may in turn result in increased battery life and improved user experience. In some examples, base station 105-b may refrain from transmitting paging information during the remainder of the plurality of POs (e.g., after sending the explicit indication). In some examples, base station 105-b may use the remainder of the ignored POs for other signaling (e.g., transmitting scheduling information to another UE 115), which may result in efficient use of resources, reduced system latency, and improved user experience.

Figure 6:
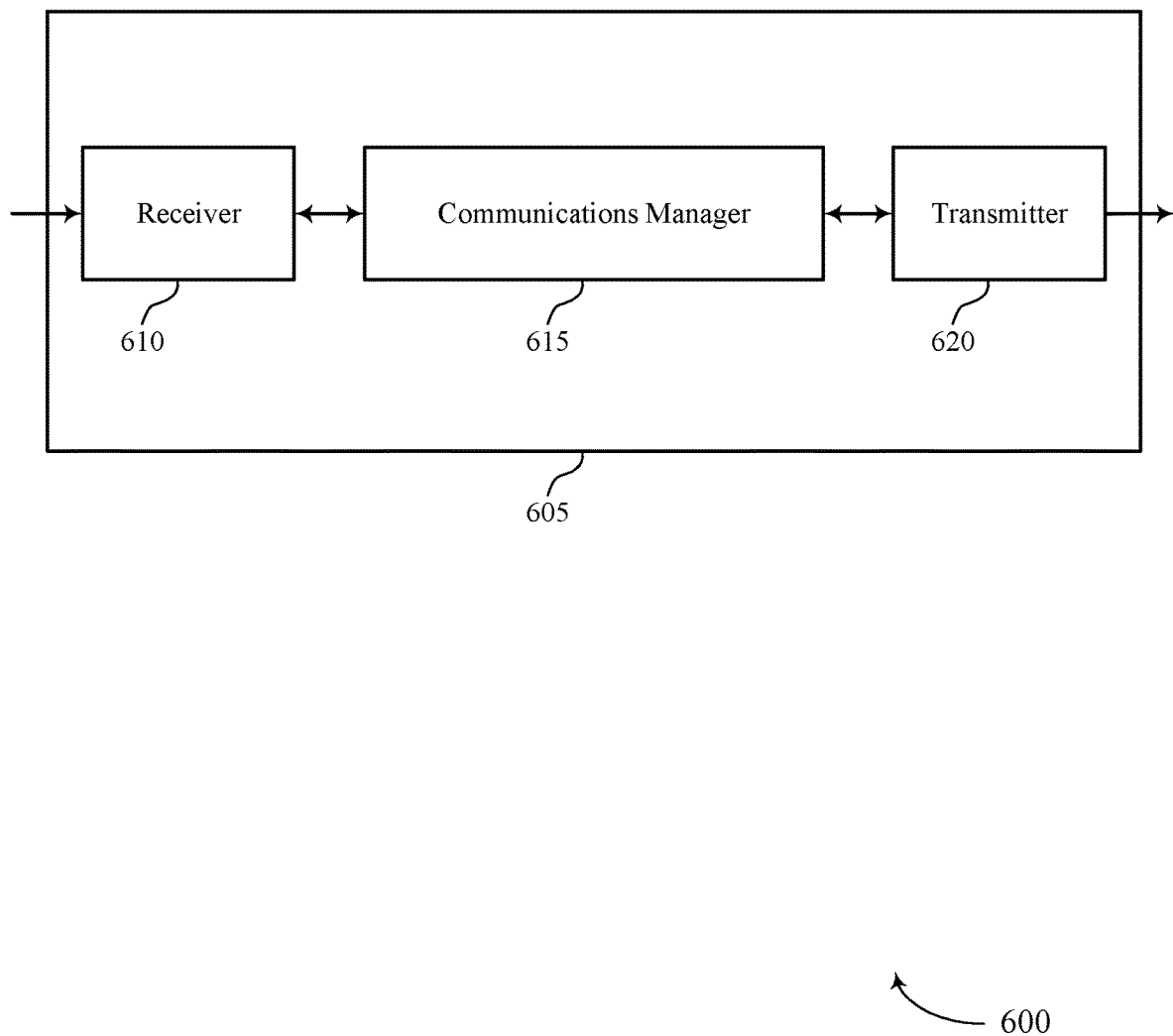
FIGS. 6 and 7 show block diagrams of devices that support paging with multiple monitoring occasions in accordance with aspects of the present disclosure.

FIG. 6 shows a block diagram 600 of a device 605 that supports paging with multiple monitoring occasions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses). The device 605 may also include a processor. Each of these components may be in communication with one another (e.g., via one or more buses). In some examples, communications manager 615 may be implemented by a wireless modem. Communications manager 615 may communicate with transmitter 620 via a first interface. Communications manager 615 may output signals for transmission via the first interface. In some examples, communications manager 615 may obtain signals received by receiver 610 from another wireless device via a second interface. The wireless modem may implement aspects of the techniques described herein, such as identifying a plurality of POs associated with a wireless channel (e.g., of an unlicensed radio frequency spectrum band), monitoring the wireless channel for paging information from a base station during a first PO of the set of POs, determining a channel occupancy status of the base station with respect to the wireless channel, determining a time to stop monitoring the wireless channel for paging information, and ignoring a remainder of the plurality of POs based on the determined time to stop monitoring the wireless channel.

Implementation of such techniques, such as by the wireless modem or a chipset, may result in additional available computing resources for increased processing efficiency. Further, the techniques described herein may avoid unnecessarily monitoring a number of POs, which may enable one or more processing units of the device 605 to return to a sleep mode faster or spend more time in a sleep mode (e.g., a DRX sleep mode, which may result in improved power savings and longer battery life of the device 605.

The receiver 610 may receive information such as packets, user data, or control information associated with various information channels (e.g., control channels, data channels, and information related to paging with multiple monitoring occasions, etc.). Information may be passed on to other components of the device 605. The receiver 610 may be an example of aspects of the transceiver 920 described with reference to FIG. 9. The receiver 610 may utilize a single antenna or a set of antennas.

In some implementations, the communications manager 615 may identify a set of POs associated with a wireless channel of an unlicensed radio frequency spectrum band, monitor the wireless channel for paging information from a base station during a first PO of the set of POs, determine a channel occupancy status of the base station with respect to the wireless channel of the unlicensed radio frequency spectrum band, determine, based on the monitoring and the channel occupancy status of the base station, a time to stop monitoring the wireless channel for paging information, and ignore a remainder of the set of POs based on the determined time.

In some other implementations, the communications manager 615 may identify a set of POs associated with a wireless channel of a radio frequency spectrum band, monitor the wireless channel for paging information from a base station during a first PO of the set of POs, receive, based on the monitoring, a paging termination message from the base station, and ignore, based on the paging termination message, a remainder of the set of POs. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
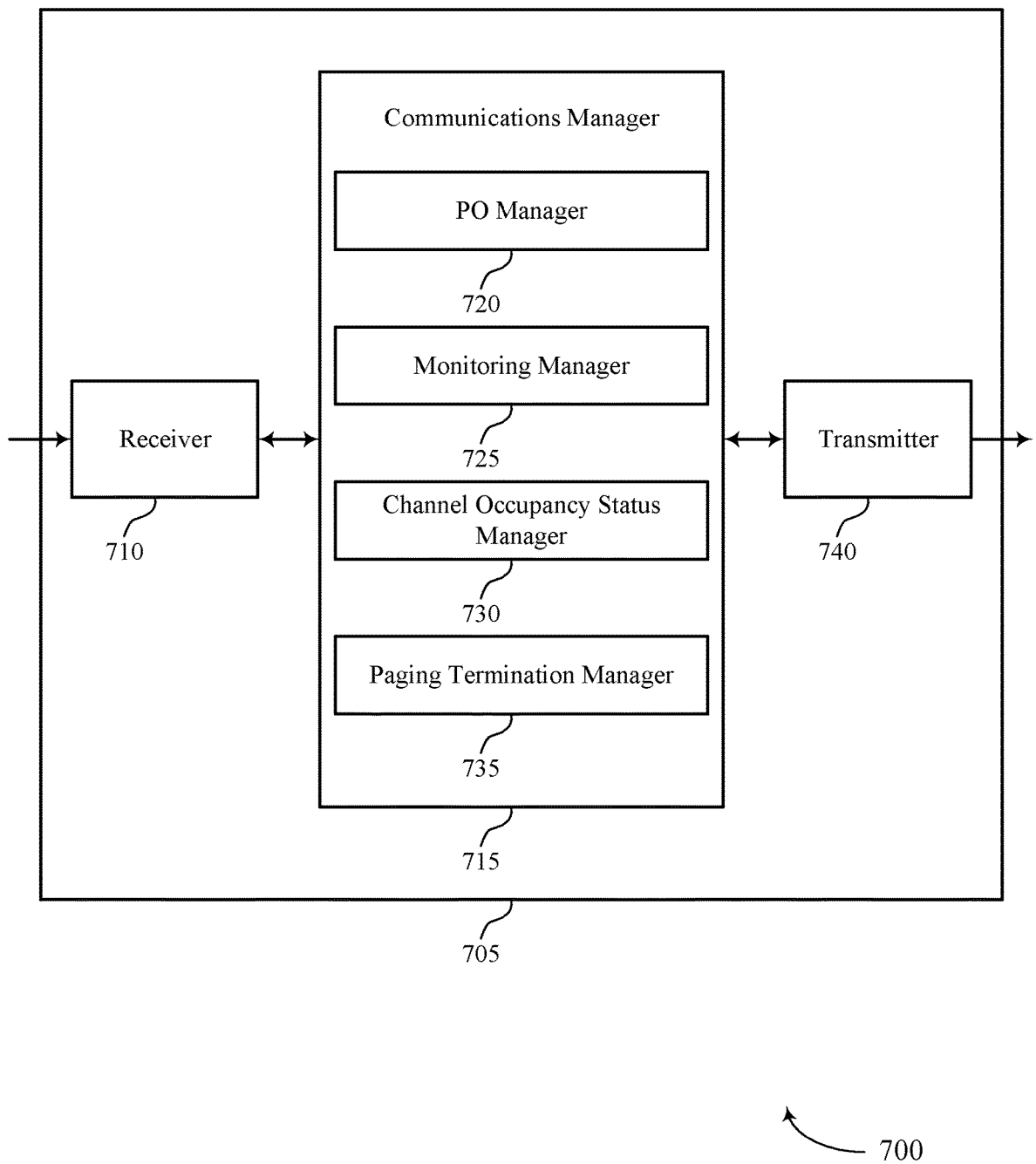

FIG. 7 shows a block diagram 700 of a device 705 that supports paging with multiple monitoring occasions in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to paging with multiple monitoring occasions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a PO manager 720, a monitoring manager 725, a channel occupancy status manager 730, and a paging termination manager 735. The communications manager 715 may be an example of aspects of the communications manager 910 described herein.

The PO manager 720 may identify a set of POs associated with a wireless channel of an unlicensed radio frequency spectrum band. The monitoring manager 725 may monitor the wireless channel for paging information from a base station during a first PO of the set of POs. The channel occupancy status manager 730 may determine a channel occupancy status of the base station with respect to the wireless channel of the unlicensed radio frequency spectrum band. The monitoring manager 725 may determine, based on the monitoring and the channel occupancy status of the base station, a time to stop monitoring the wireless channel for paging information. The PO manager 720 may ignore a remainder of the set of POs based on the determined time.

The PO manager 720 may identify a set of POs associated with a wireless channel of a radio frequency spectrum band. The monitoring manager 725 may monitor the wireless channel for paging information from a base station during a first PO of the set of POs. The paging termination manager 735 may receive, based on the monitoring, a paging termination message from the base station. The PO manager 720 may ignore, based on the paging termination message, a remainder of the set of paging occasions.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
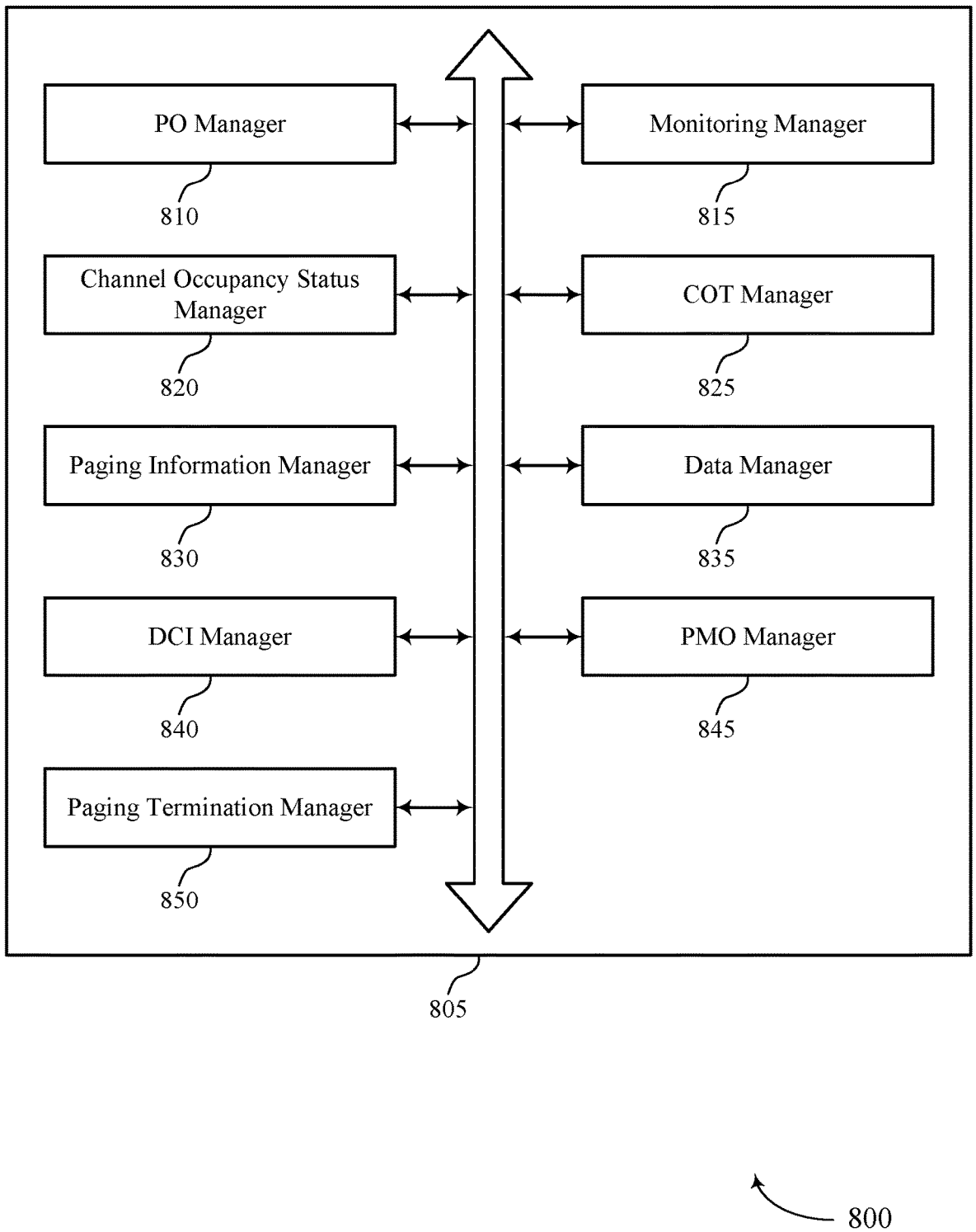
FIG. 8 shows a block diagram of a communications manager that supports paging with multiple monitoring occasions in accordance with aspects of the present disclosure.

FIG. 8 shows a block diagram 800 of a communications manager 805 that supports paging with multiple monitoring occasions in accordance with aspects of the present disclosure. The communications manager 805 may be an example of aspects of a communications manager 615, a communications manager 715, or a communications manager 910 described herein. The communications manager 805 may include a PO manager 810, a monitoring manager 815, a channel occupancy status manager 820, a COT manager 825, a paging information manager 830, a data manager 835, a DCI manager 840, a PMO manager 845, and a paging termination manager 850. Each of these modules may communicate, directly or indirectly, with one another (e.g., via one or more buses).

The PO manager 810 may identify a set of POs associated with a wireless channel of an unlicensed radio frequency spectrum band. In some examples, the PO manager 810 may ignore a remainder of the set of POs based on the determined time. In some examples, the PO manager 810 may identify a set of POs associated with a wireless channel of a radio frequency spectrum band. In some examples, the PO manager 810 may ignore, based on the paging termination message, a remainder of the set of POs. In some examples, the radio frequency spectrum band may be an unlicensed radio frequency spectrum band and the PO manager 810 may receive an initial signal from the base station associated with a beginning of a COT and determine that the first PO is a next PO of the plurality of POs following the beginning of the COT.

In some examples, the PO manager 810 may ignore the remainder of the set of POs immediately after receiving the paging termination message. In some examples, the PO manager 810 may identify a threshold amount of time after receiving an explicit indication in the paging termination message and ignore the remainder of the set of POs upon expiration of the threshold amount of time after receiving the explicit indication.

The monitoring manager 815 may monitor the wireless channel for paging information from a base station during a first PO of the set of POs. In some examples, the monitoring manager 815 may determine, based on the monitoring and the channel occupancy status of the base station, a time to stop monitoring the wireless channel for paging information. The monitoring manager 815 may receive a configuration message from the base station configuring the group of UEs to monitor the first paging occasion.

The channel occupancy status manager 820 may determine a channel occupancy status of the base station with respect to the wireless channel of the unlicensed radio frequency spectrum band.

The paging termination manager 850 may receive, based on the monitoring, a paging termination message from the base station. In some cases, the paging termination message is included in a DCI message. In some cases, the paging termination message is included in a paging message. In some cases, the paging termination message includes an explicit indication, where ignoring the remainder of the set of POs is based at least in part on the explicit indication.

In some cases, the paging termination message is addressed to the UE. In some cases, the paging termination message is addressed to a group of UEs including the UE. In some cases, the group of UEs is based on an S-TMSI.

The COT manager 825 may identify a COT for the base station, where the first PO is a next PO of the set of POs following the beginning of the COT.

In some examples, the COT manager 825 may receive a COT-SI from the base station, the COT-SI indicating the timing of the COT. In some cases, determining the time to stop monitoring the wireless channel for paging information includes determining to ignore the remainder of the set of POs subsequent to the first monitoring occasion based on the COT-SI.

The paging information manager 830 may detect an absence of paging information for the UE during the first monitoring occasion, where determining the time to stop monitoring the wireless channel for paging information is based on the detected absence of paging information. In some examples, the paging information manager 830 may receive paging information from the base station for the UE during the first monitoring occasion where determining the time to stop monitoring the wireless channel for paging information is based on receiving the paging information.

The data manager 835 may detect a data transmission from the base station during the first PO. In some examples, determining the time to stop monitoring the wireless channel for paging information is based on the data transmission. In some examples, the data manager 835 may detect a C-RNTI corresponding to the UE, where detecting the data transmission is based on the C-RNTI.

The DCI manager 840 may receive or process a DCI corresponding to a PDSCH transmission. The DCI manager 840 may contain a grant of resources for the PDSCH transmission.

The PMO manager 845 may receive, during a first PMO of the set of PMOs of the first PO, a signal from the base station. In some examples, determining the time to stop monitoring the wireless channel for paging information further includes determining to stop monitoring subsequent PMOs of the set of PMOs based on receiving the signal from the base station.

Figure 9:
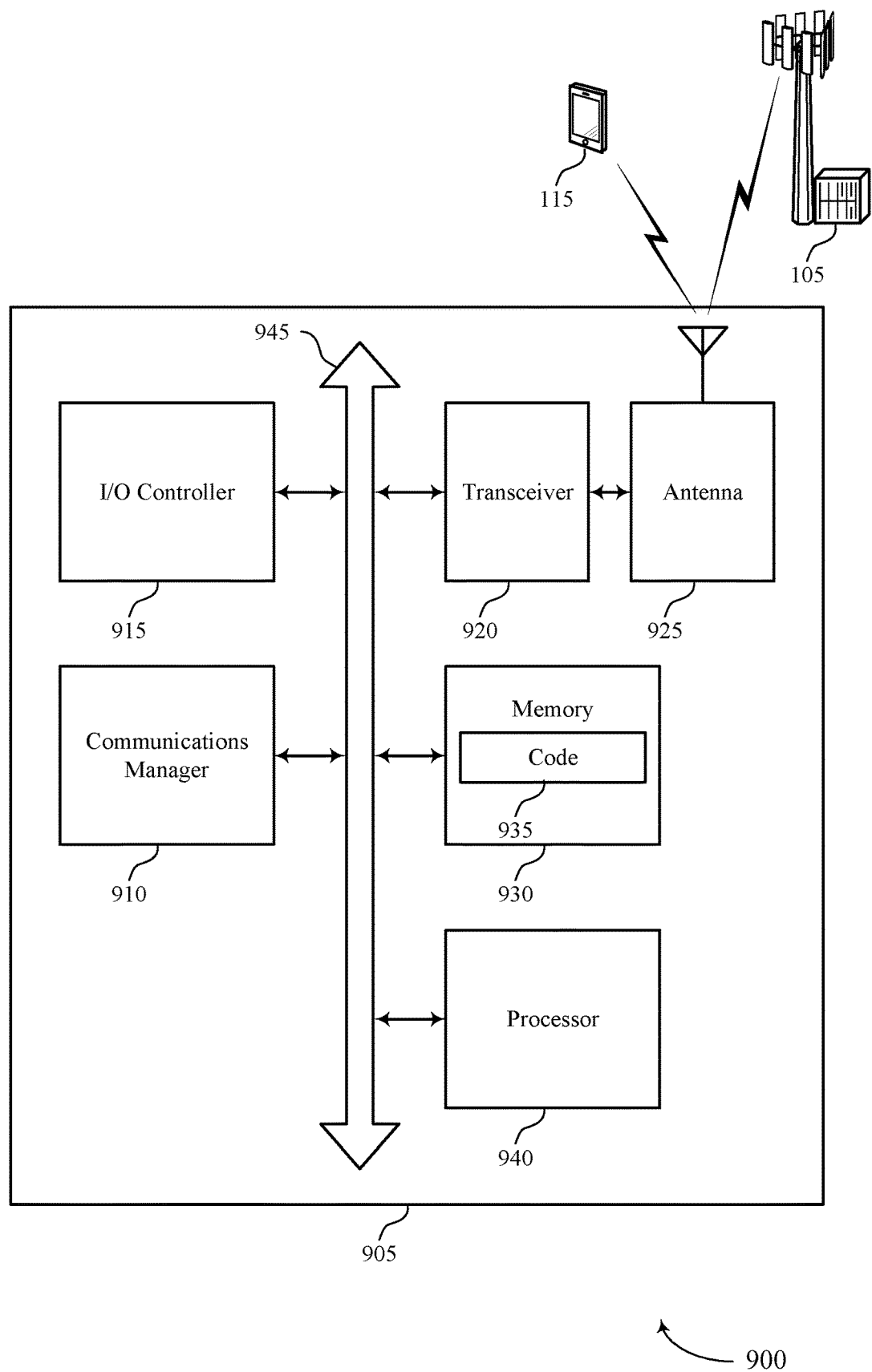
FIG. 9 shows a diagram of a system including a device that supports paging with multiple monitoring occasions in accordance with aspects of the present disclosure.

FIG. 9 shows a diagram of a system 900 including a device 905 that supports paging with multiple monitoring occasions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

In some implementations, the communications manager 910 may identify a set of POs associated with a wireless channel of an unlicensed radio frequency spectrum band, monitor the wireless channel for paging information from a base station during a first PO of the set of POs, determine a channel occupancy status of the base station with respect to the wireless channel of the unlicensed radio frequency spectrum band, determine, based on the monitoring and the channel occupancy status of the base station, a time to stop monitoring the wireless channel for paging information, and ignore a remainder of the set of POs based on the determined time.

In some other implementations, the communications manager 910 may identify a set of POs associated with a wireless channel of a radio frequency spectrum band, monitor the wireless channel for paging information from a base station during a first PO of the set of POs, receive, based on the monitoring, a paging termination message from the base station, and ignore, based on the paging termination message, a remainder of the set of paging occasions.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting paging with multiple monitoring occasions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
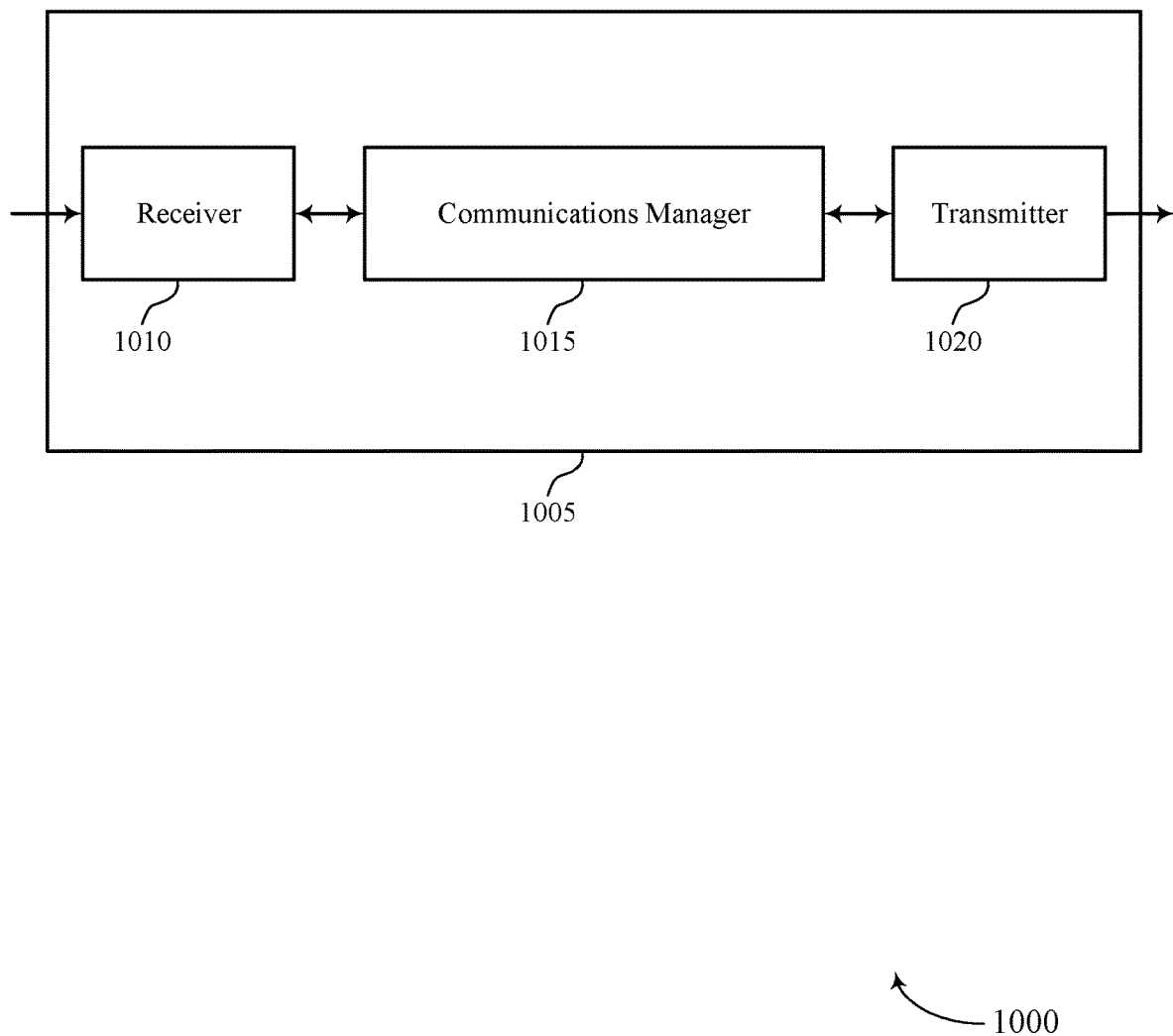
FIGS. 10 and 11 show block diagrams of devices that support paging with multiple monitoring occasions in accordance with aspects of the present disclosure.

FIG. 10 shows a block diagram 1000 of a device 1005 that supports paging with multiple monitoring occasions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses). In some examples, communications manager 1015 may be implemented by a wireless modem. Communications manager 1015 may communicate with transmitter 1020 via a first interface. Communications manager 1015 may output signals for transmission via the first interface. In some examples, communications manager 1015 may obtain signals received by receiver 1010 from another wireless device via a second interface. The wireless modem may implement aspects of techniques described herein, resulting in decreased computational costs, increased efficiency of computing resources, and less battery consumption by the device.

The receiver 1010 may receive information such as packets, user data, or control information associated with various information channels (e.g., control channels, data channels, and information related to paging with multiple monitoring occasions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of POs associated with a wireless channel of a radio frequency spectrum band, send, during a first PO of the set of POs, a paging termination message to a UE, and refrain, based on the paging termination message, from transmitting paging information during a remainder of the set of POs. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
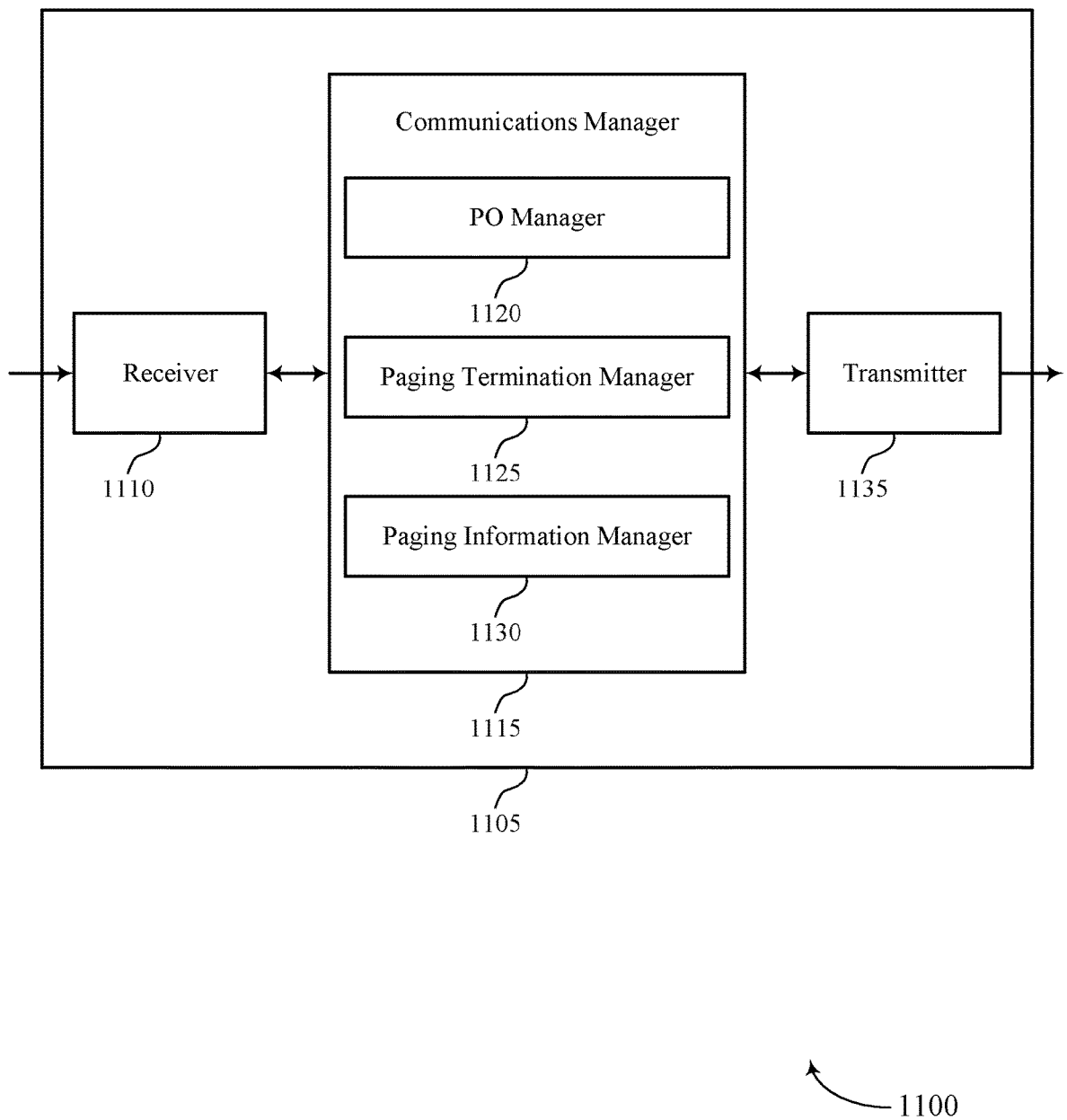

FIG. 11 shows a block diagram 1100 of a device 1105 that supports paging with multiple monitoring occasions in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to paging with multiple monitoring occasions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a paging occasion manager 1120, a paging termination manager 1125, and a paging information manager 1130. The communications manager 1115 may be an example of aspects of the communications manager 1310 described herein.

The paging occasion manager 1120 may identify a set of POs associated with a wireless channel of a radio frequency spectrum band. These POs may be configured by device 1105 over higher layers (e.g., RRC communications, such as an RRC configuration message) or calculated by device 1105 and associated UEs using a standardized formula.

The paging termination manager 1125 may send, during a first PO of the set of POs, a paging termination message to a UE. The paging termination message may be addressed to a P-RNTI associated with an individual UE or may be broadcast to multiple devices.

The paging information manager 1130 may refrain, based on the paging termination message, from transmitting paging information during a remainder of the set of POs.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
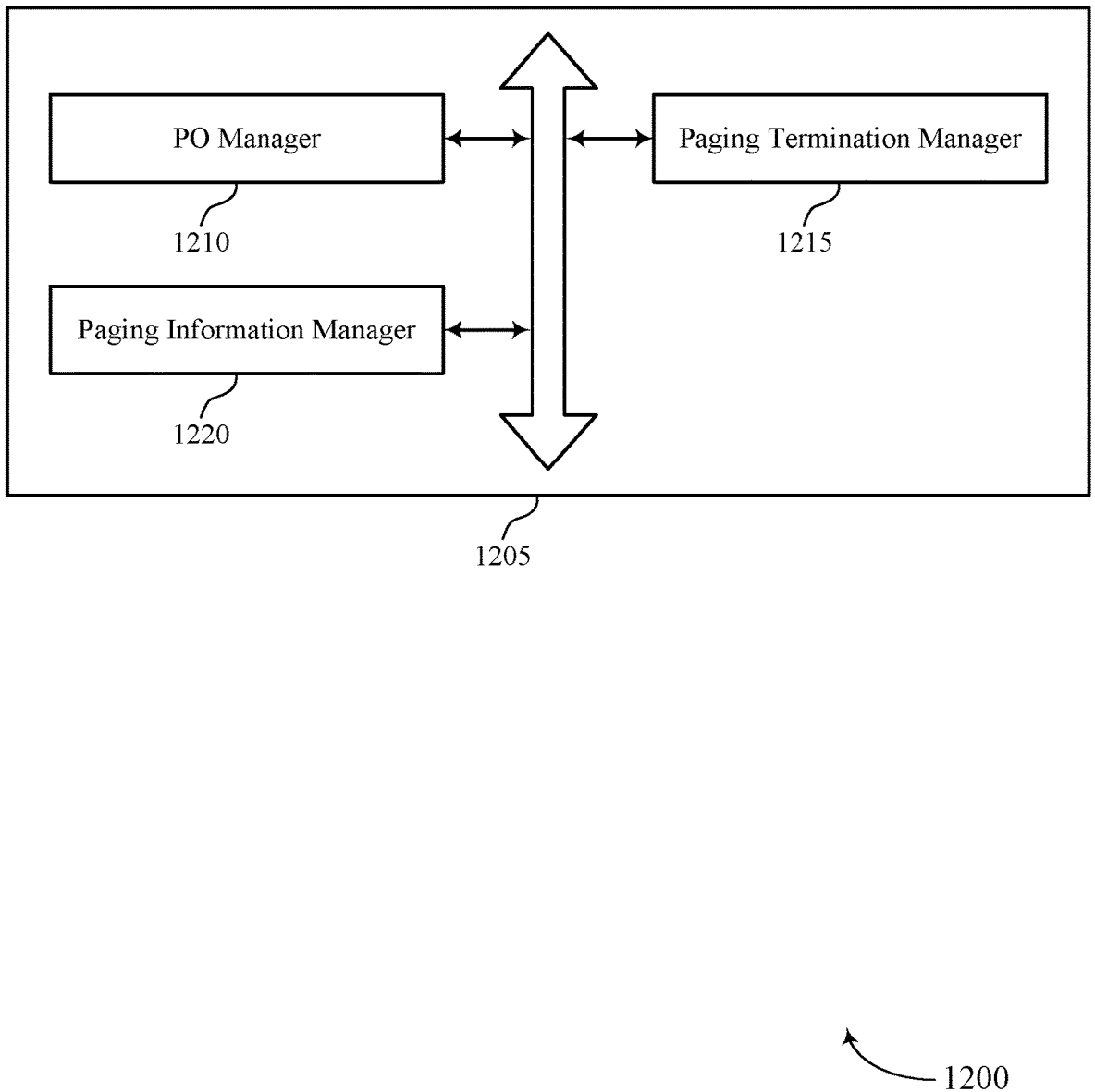
FIG. 12 shows a block diagram of a communications manager that supports paging with multiple monitoring occasions in accordance with aspects of the present disclosure.

FIG. 12 shows a block diagram 1200 of a communications manager 1205 that supports paging with multiple monitoring occasions in accordance with aspects of the present disclosure. The communications manager 1205 may be an example of aspects of a communications manager 1015, a communications manager 1115, or a communications manager 1310 described herein. The communications manager 1205 may include a paging occasion manager 1210, a paging termination manager 1215, and a paging information manager 1220. Each of these modules may communicate, directly or indirectly, with one another (e.g., via one or more buses).

The paging occasion manager 1210 may identify a set of POs associated with a wireless channel of a radio frequency spectrum band.

The paging termination manager 1215 may send, during a first PO of the set of POs, a paging termination message to a UE. In some cases, the paging termination message is included in a DCI message. In some cases, the paging termination message is included in a paging message. In some cases, the paging termination message includes an explicit indication, and where refraining from transmitting paging information during the remainder of the plurality of POs is based on the explicit indication.

In some cases, the paging termination message is addressed to at least one of the UE or to a group of UEs. In some cases, the group of UEs is based on a system architecture evolution S-TMSI.

The paging information manager 1220 may refrain, based on the paging termination message, from transmitting paging information during a remainder of the set of POs.

Figure 13:
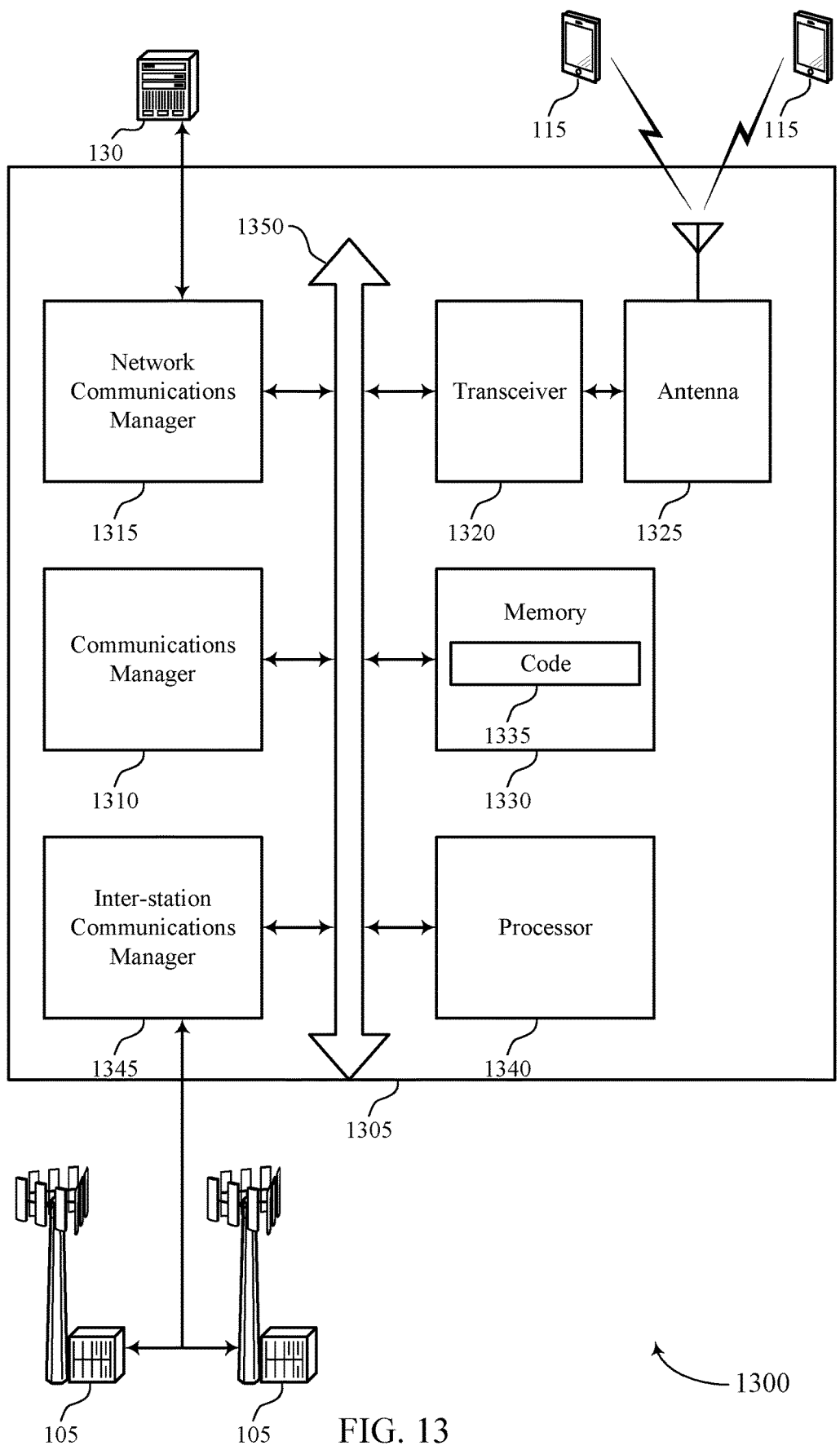
FIG. 13 shows a diagram of a system including a device that supports paging with multiple monitoring occasions in accordance with aspects of the present disclosure.

FIG. 13 shows a diagram of a system 1300 including a device 1305 that supports paging with multiple monitoring occasions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of POs associated with a wireless channel of a radio frequency spectrum band, send, during a first PO of the set of POs, a paging termination message to a UE, and refrain, based on the paging termination message, from transmitting paging information during a remainder of the set of POs.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting paging with multiple monitoring occasions).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
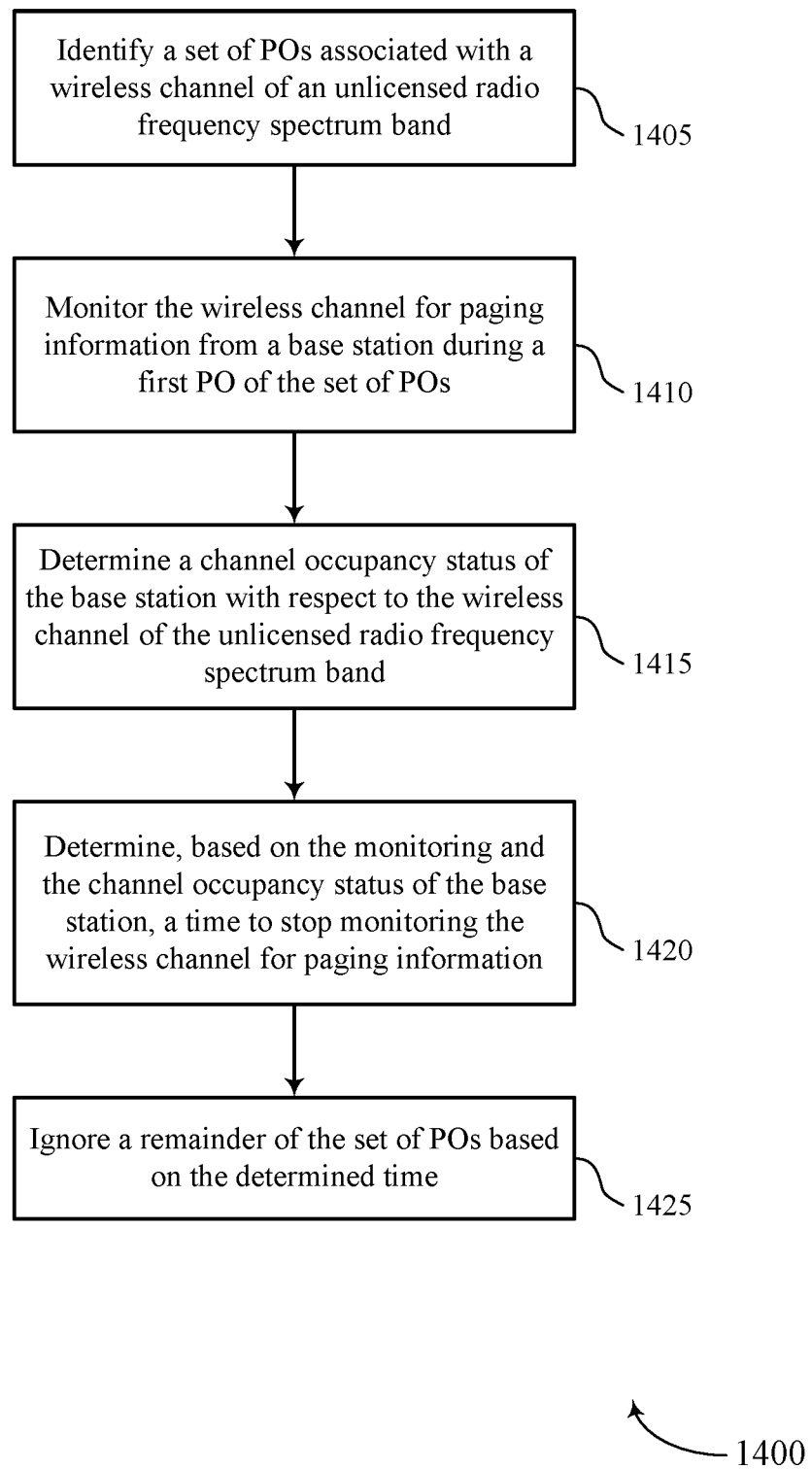
FIGS. 14 through 16 show flowcharts illustrating methods that support paging with multiple monitoring occasions in accordance with aspects of the present disclosure.

FIG. 14 shows a flowchart illustrating a method 1400 that supports paging with multiple monitoring occasions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1405, the UE may identify a set of POs associated with a wireless channel of an unlicensed radio frequency spectrum band. The operations of 1405 may be performed according to the methods described herein. In some examples, aspects of the operations of 1405 may be performed by a PO manager as described with reference to FIGS. 6 through 9.

At 1410, the UE may monitor the wireless channel for paging information from a base station during a first PO of the set of POs. The operations of 1410 may be performed according to the methods described herein. In some examples, aspects of the operations of 1410 may be performed by a monitoring manager as described with reference to FIGS. 6 through 9.

At 1415, the UE may determine a channel occupancy status of the base station with respect to the wireless channel of the unlicensed radio frequency spectrum band. The operations of 1415 may be performed according to the methods described herein. In some examples, aspects of the operations of 1415 may be performed by a channel occupancy status manager as described with reference to FIGS. 6 through 9.

At 1420, the UE may determine, based on the monitoring and the channel occupancy status of the base station, a time to stop monitoring the wireless channel for paging information. The operations of 1420 may be performed according to the methods described herein. In some examples, aspects of the operations of 1420 may be performed by a monitoring manager as described with reference to FIGS. 6 through 9.

At 1425, the UE may ignore a remainder of the set of POs based on the determined time. The operations of 1425 may be performed according to the methods described herein. In some examples, aspects of the operations of 1425 may be performed by a PO manager as described with reference to FIGS. 6 through 9.

Figure 15:
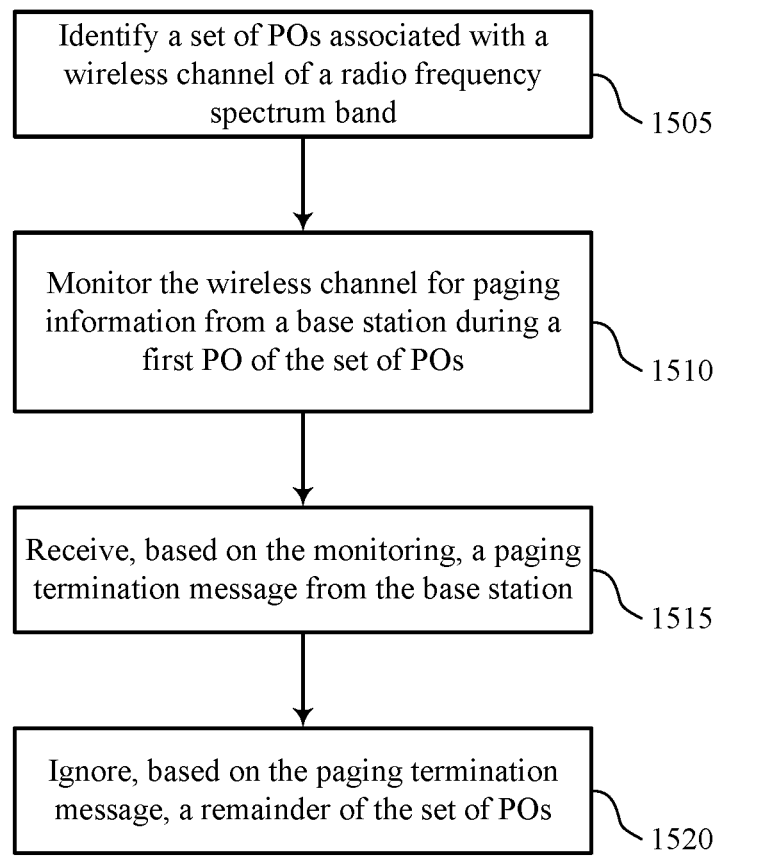

FIG. 15 shows a flowchart illustrating a method 1500 that supports paging with multiple monitoring occasions in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1505, the UE may identify a set of POs associated with a wireless channel of a radio frequency spectrum band. The operations of 1505 may be performed according to the methods described herein. In some examples, aspects of the operations of 1505 may be performed by a PO manager as described with reference to FIGS. 6 through 9.

At 1510, the UE may monitor the wireless channel for paging information from a base station during a first PO of the set of POs. The operations of 1510 may be performed according to the methods described herein. In some examples, aspects of the operations of 1510 may be performed by a monitoring manager as described with reference to FIGS. 6 through 9.

At 1515, the UE may receive, based on the monitoring, a paging termination message from the base station. The operations of 1515 may be performed according to the methods described herein. In some examples, aspects of the operations of 1515 may be performed by a paging termination manager as described with reference to FIGS. 6 through 9.

At 1520, the UE may ignore, based on the paging termination message, a remainder of the set of PO. The operations of 1520 may be performed according to the methods described herein. In some examples, aspects of the operations of 1520 may be performed by a PO manager as described with reference to FIGS. 6 through 9.

Figure 16:
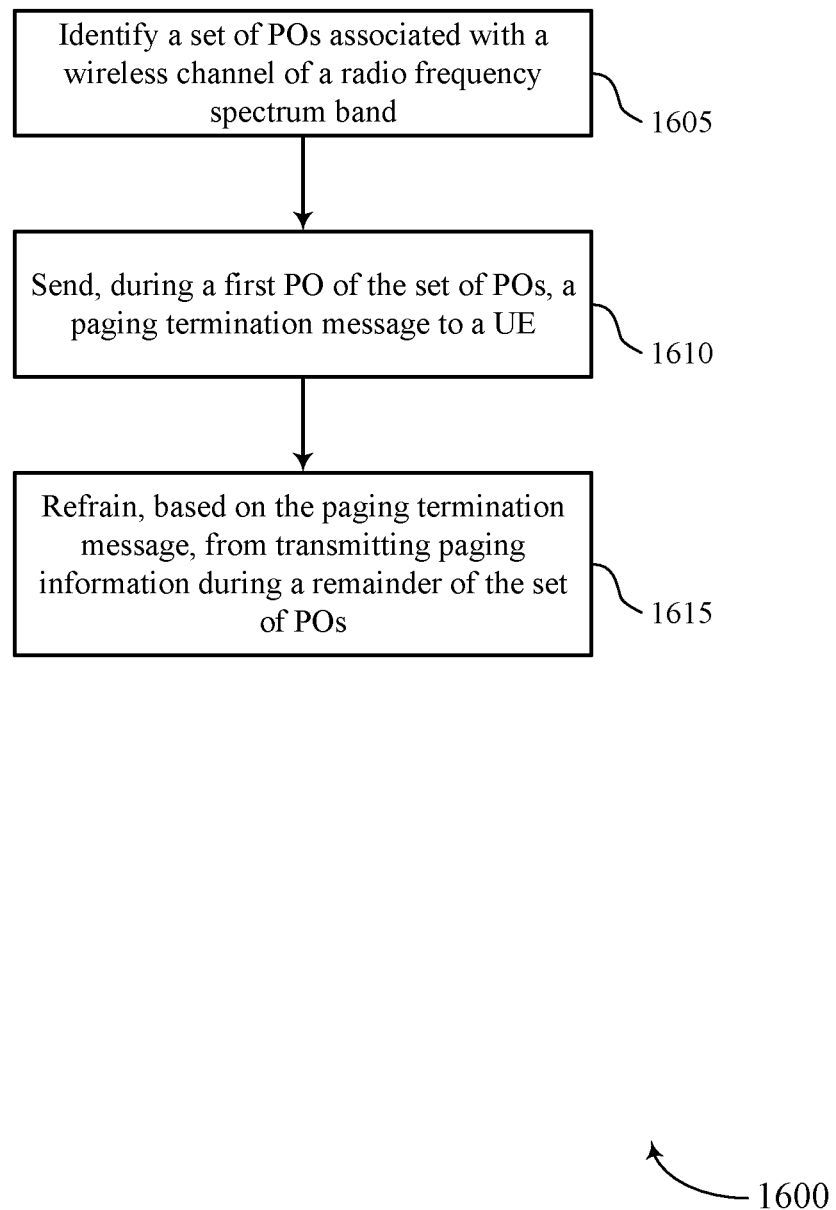

FIG. 16 shows a flowchart illustrating a method 1600 that supports paging with multiple monitoring occasions in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1605, the base station may identify a set of POs associated with a wireless channel of a radio frequency spectrum band. The operations of 1605 may be performed according to the methods described herein. In some examples, aspects of the operations of 1605 may be performed by a PO manager as described with reference to FIGS. 10 through 13.

At 1610, the base station may send, during a first PO of the set of POs, a paging termination message to a UE. The operations of 1610 may be performed according to the methods described herein. In some examples, aspects of the operations of 1610 may be performed by a paging termination manager as described with reference to FIGS. 10 through 13.

At 1615, the base station may refrain, based on the paging termination message, from transmitting paging information during a remainder of the set of POs. The operations of 1615 may be performed according to the methods described herein. In some examples, aspects of the operations of 1615 may be performed by a paging information manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
    a processor,
    memory coupled with the processor; and
    instructions stored in the memory and executable by the processor to cause the apparatus to:
        receive, from a base station, a configuration for monitoring a plurality of paging occasions, wherein the plurality of paging occasions are associated with a wireless channel of an unlicensed radio frequency spectrum band;
        identify a paging occasion of the plurality of paging occasions based at least in part on the received configuration;
        monitor the wireless channel for paging information from the base station during the paging occasion of the plurality of paging occasions;
        receive, via an indication in a downlink control information message and based at least in part on the monitoring the paging occasion, a paging termination message from the base station; and
        ignore, based at least in part on the paging termination message, a remainder of paging occasions of the plurality of paging occasions subsequent to the paging occasion.

2. The apparatus of claim 1, wherein the paging termination message is included in a paging message.

3. The apparatus of claim 1, wherein the paging termination message comprises an explicit indication, and wherein ignoring the remainder of paging occasions of the plurality of paging occasions is based at least in part on the explicit indication.

4. The apparatus of claim 1, wherein the paging termination message is addressed to the UE.

5. The apparatus of claim 1, wherein the paging termination message is addressed to a group of UEs including the UE.

6. The apparatus of claim 5, wherein the instructions are further executable by the processor to cause the apparatus to:
receive a configuration message from the base station configuring the group of UEs to monitor the paging occasion.

7. The apparatus of claim 5, wherein the group of UEs is based at least in part on a system architecture evolution (SAE) temporary mobile subscriber identity (S-TMSI).

8. The apparatus of claim 1, wherein the instructions are further executable by the processor to cause the apparatus to:
receive an initial signal from the base station associated with a beginning of a channel occupancy time (COT); and
determine that the paging occasion is a next paging occasion of the plurality of paging occasions following the beginning of the COT.

9. The apparatus of claim 1, wherein the instructions to ignore the remainder of paging occasions of the plurality of paging occasions are executable by the processor to cause the apparatus to:
ignore the remainder of paging occasions of the plurality of paging occasions immediately after receiving the paging termination message.

10. The apparatus of claim 1, wherein the instructions to ignore the remainder of paging occasions of the plurality of paging occasions are executable by the processor to cause the apparatus to:
identify a threshold amount of time after receiving an explicit indication in the paging termination message; and
ignore the remainder of paging occasions of the plurality of paging occasions upon expiration of the threshold amount of time after receiving the explicit indication.

11. The apparatus of claim 1, wherein the configuration in the downlink control information message is received independent of the configuration for monitoring the plurality of paging occasions.

12. An apparatus for wireless communications at a user equipment (UE), comprising:
a processor,
memory coupled with the processor; and
instructions stored in the memory and executable by the processor to cause the apparatus to:
identify a plurality of paging occasions associated with a wireless channel of an unlicensed radio frequency spectrum band;
monitor the wireless channel for paging information from a base station during a first paging occasion of the plurality of paging occasions;
determine a channel occupancy status of the base station with respect to the wireless channel of the unlicensed radio frequency spectrum band based at least in part on an indication in a downlink control information message;
identify a channel occupancy time (COT) for the base station based at least in part on determining the channel occupancy status, wherein the first paging occasion is a next paging occasion of the plurality of paging occasions following a beginning of the COT;
determine, based at least in part on the monitoring and the channel occupancy status of the base station, a time to stop monitoring the wireless channel for the paging information; and
ignore a remainder of paging occasions of the plurality of paging occasions based on the determined time.

13. The apparatus of claim 12, wherein the instructions to determine the channel occupancy status of the base station are executable by the processor to cause the apparatus to:
the instructions to receive a channel occupancy time structure indication (COT-SI) from the base station, the COT-SI indicating a timing of the COT; and wherein
the instructions to determine the time to stop monitoring the wireless channel for the paging information are executable by the processor to cause the apparatus to determine to ignore the remainder of paging occasions of the plurality of paging occasions subsequent to the first paging occasion based at least in part on the COT-SI.

14. The apparatus of claim 12, wherein the instructions are further executable by the processor to cause the apparatus to:
detect an absence of the paging information for the UE during the first paging occasion, wherein determining the time to stop monitoring the wireless channel for the paging information is based at least in part on the detected absence of the paging information.

15. The apparatus of claim 12, wherein the instructions are further executable by the processor to cause the apparatus to:
receive the paging information from the base station for the UE during the first paging occasion wherein determining the time to stop monitoring the wireless channel for the paging information is based at least in part on receiving the paging information.

16. The apparatus of claim 12, wherein the instructions to determine the channel occupancy status of the base station further are executable by the processor to cause the apparatus to:
detect a data transmission from the base station during the first paging occasion, wherein determining the time to stop monitoring the wireless channel for the paging information is based at least in part on the data transmission.

17. The apparatus of claim 16, wherein the instructions are further executable by the processor to cause the apparatus to:
detect a cell radio network temporary identifier (C-RNTI) corresponding to the UE, wherein detecting the data transmission is based at least in part on the C-RNTI.

18. The apparatus of claim 12, wherein the instructions to determine the channel occupancy status of the base station further are executable by the processor to cause the apparatus to:
receive the downlink control information message corresponding to a physical downlink shared channel (PDSCH).

19. The apparatus of claim 12, wherein the first paging occasion comprises a plurality of paging monitoring occasions associated with different beams, and the instructions are further executable by the processor to cause the apparatus to:

receive, during a first paging monitoring occasion of the plurality of paging monitoring occasions of the first paging occasion, a signal from the base station; and wherein the instructions to determine the time to stop monitoring the wireless channel for the paging information further are executable by the processor to cause the apparatus to determine to stop monitoring subsequent paging monitoring occasions of the plurality of paging monitoring occasions based at least in part on receiving the signal from the base station.

20. An apparatus for wireless communications at a base station, comprising:
a processor;
memory coupled with the processor; and
instructions stored in the memory and executable by the processor to cause the apparatus to:
identify a plurality of paging occasions, wherein the plurality of paging occasions are associated with a wireless channel of an unlicensed radio frequency spectrum band;
send, to a user equipment (UE), a configuration for monitoring the plurality of paging occasions;
send, during a paging occasion of the plurality of paging occasions, a paging termination message to the UE via an indication in a downlink control information message; and
refrain, based at least in part on the paging termination message, from transmitting paging information during a remainder of paging occasions of the plurality of paging occasions subsequent to the paging occasion.

21. The apparatus of claim 20, wherein the paging termination message is included in a paging message.

22. The apparatus of claim 21, wherein the paging termination message comprises an explicit indication, and wherein refraining from transmitting the paging information during the remainder of paging occasions of the plurality of paging occasions is based at least in part on the explicit indication.

23. The apparatus of claim 20, wherein the paging termination message is addressed to at least one of the UE or to a group of UEs.

24. The apparatus of claim 23, wherein the group of UEs is based at least in part on a system architecture evolution (SAE) temporary mobile subscriber identity (S-TMSI).

25. A method for wireless communications at a user equipment (UE), comprising:
receiving, from a base station, a configuration for monitoring a plurality of paging occasions, wherein the plurality of paging occasions are associated with a wireless channel of an unlicensed radio frequency spectrum band;
identifying a paging occasion of the plurality of paging occasions based at least in part on the received configuration;
monitoring the wireless channel for paging information from the base station during the paging occasion of the plurality of paging occasions;
receiving, via an indication in a downlink control information message and based at least in part on the monitoring the paging occasion, a paging termination message from the base station; and
ignoring, based at least in part on the paging termination message, a remainder of paging occasions of the plurality of paging occasions subsequent to the paging occasion.

26. The method of claim 25, wherein the paging termination message is included in a paging message.

27. The method of claim 25, wherein the paging termination message comprises an explicit indication, and wherein ignoring the remainder of paging occasions of the plurality of paging occasions is based at least in part on the explicit indication.

28. The method of claim 25, wherein the paging termination message is addressed to the UE.

29. The method of claim 25, wherein the paging termination message is addressed to a group of UEs including the UE.

30. The method of claim 29, further comprising:
receiving a configuration message from the base station configuring the group of UEs to monitor the paging occasion.

31. The method of claim 29, wherein the group of UEs is based at least in part on a system architecture evolution (SAE) temporary mobile subscriber identity (S-TMSI).

32. The method of claim 25, the method further comprising:
receiving an initial signal from the base station associated with a beginning of a channel occupancy time (COT); and
determining that the paging occasion is a next paging occasion of the plurality of paging occasions following the beginning of the COT.

33. The method of claim 25, wherein ignoring the remainder of paging occasions of the plurality of paging occasions comprises:
ignoring the remainder of paging occasions of the plurality of paging occasions immediately after receiving the paging termination message.

34. The method of claim 25, wherein ignoring the remainder of paging occasions of the plurality of paging occasions comprises:
identifying a threshold amount of time after receiving an explicit indication in the paging termination message; and
ignoring the remainder of paging occasions of the plurality of paging occasions upon expiration of the threshold amount of time after receiving the explicit indication.

35. A method for wireless communications at a user equipment (UE), comprising:
identifying a plurality of paging occasions associated with a wireless channel of an unlicensed radio frequency spectrum band;
monitoring the wireless channel for paging information from a base station during a first paging occasion of the plurality of paging occasions;
determining a channel occupancy status of the base station with respect to the wireless channel of the unlicensed radio frequency spectrum band based at least in part on an indication in a downlink control information message;
identify a channel occupancy time (COT) for the base station based at least in part on determining the channel occupancy status, wherein the first paging occasion is a next paging occasion of the plurality of paging occasions following a beginning of the COT;
determining, based at least in part on the monitoring and the channel occupancy status of the base station, a time to stop monitoring the wireless channel for the paging information; and
ignoring a remainder of paging occasions of the plurality of paging occasions based on the determined time.

36. The method of claim 35, wherein determining the channel occupancy status of the base station comprises:
receiving a channel occupancy time structure indication (COT-SI) from the base station, the COT-SI indicating a timing of the COT;
wherein determining the time to stop monitoring the wireless channel for the paging information comprises determining to ignore the remainder of paging occasions of the plurality of paging occasions subsequent to the first paging occasion based at least in part on the COT-SI.

37. The method of claim 35, further comprising:
detecting an absence of the paging information for the UE during the first paging occasion, wherein determining the time to stop monitoring the wireless channel for the paging information is based at least in part on the detected absence of the paging information.

38. The method of claim 35, further comprising:
receiving the paging information from the base station for the UE during the first paging occasion wherein determining the time to stop monitoring the wireless channel for the paging information is based at least in part on receiving the paging information.

39. The method of claim 35, wherein determining the channel occupancy status of the base station further comprises:
detecting a data transmission from the base station during the first paging occasion, wherein determining the time to stop monitoring the wireless channel for the paging information is based at least in part on the data transmission.

40. The method of claim 39, further comprising:
detecting a cell radio network temporary identifier (C-RNTI) corresponding to the UE, wherein detecting the data transmission is based at least in part on the C-RNTI.

41. The method of claim 35, wherein determining the channel occupancy status of the base station further comprises:
receiving the downlink control information message corresponding to a physical downlink shared channel (PDSCH).

42. The method of claim 35, wherein the first paging occasion comprises a plurality of paging monitoring occasions associated with different beams, further comprising:
receiving, during a first paging monitoring occasion of the plurality of paging monitoring occasions of the first paging occasion, a signal from the base station; and
wherein:
determining the time to stop monitoring the wireless channel for the paging information further comprises determining to stop monitoring subsequent paging monitoring occasions of the plurality of paging monitoring occasions based at least in part on receiving the signal from the base station.

43. A method for wireless communications at a base station, comprising:
identifying a plurality of paging occasions, wherein the plurality of paging occasions are associated with a wireless channel of an unlicensed radio frequency spectrum band;
sending, to a user equipment (UE), a configuration for monitoring the plurality of paging occasions;
sending, during a paging occasion of the plurality of paging occasions, a paging termination message to the UE via an indication in a downlink control information message; and
refraining, based at least in part on the paging termination message, from transmitting paging information during a remainder of paging occasions of the plurality of paging occasions subsequent to the paging occasion.

44. The method of claim 43, wherein the paging termination message is included in a paging message.

45. The method of claim 44, wherein the paging termination message comprises an explicit indication, and wherein refraining from transmitting the paging information during the remainder of paging occasions of the plurality of paging occasions is based at least in part on the explicit indication.

46. The method of claim 43, wherein the paging termination message is addressed to at least one of the UE or to a group of UEs.

47. The method of claim 46, wherein the group of UEs is based at least in part on a system architecture evolution (SAE) temporary mobile subscriber identity (S-TMSI).

* * * * *